US012625863B1

(12) United States Patent
Li et al.

(10) Patent No.: US 12,625,863 B1
(45) Date of Patent: May 12, 2026

(54) DATABASE-CENTRIC OPERATING SYSTEM FOR DURABLE WORKFLOW

(71) Applicant: DBOS, Inc., Boston, MA (US)

(72) Inventors: Qian Li, Sunnyvale, CA (US); Peter Kraft, Sunnyvale, CA (US); Henri Maxime Demoulin, Campbell, CA (US); Charles Bear, Hudson, MA (US); Harold Pierson, III, Redmond, WA (US); Manoj Khangaonkar, Pleasanton, CA (US); Alexandre Poliakov, Boston, MA (US); Leander Neiss, East Haddam, CT (US); Mike Stonebraker, Boston, MA (US); Michael Coden, Bronx, NY (US)

(73) Assignee: DBOS, Inc., Boston, MA (US)

( * ) Notice: Subject to any disclaimer, the term of this patent is extended or adjusted under 35 U.S.C. 154(b) by 0 days.

(21) Appl. No.: 18/982,521

(22) Filed: Dec. 16, 2024

(51) Int. Cl.
| | |
|---|---|
| *G06F 16/23* | (2019.01) |
| *G06F 16/17* | (2019.01) |
| *G06F 16/21* | (2019.01) |
| *G06F 16/27* | (2019.01) |
| *G06Q 10/0635* | (2023.01) |

(52) U.S. Cl.
CPC ...... *G06F 16/2379* (2019.01); *G06F 16/1734* (2019.01); *G06F 16/219* (2019.01); *G06F 16/2365* (2019.01); *G06F 16/27* (2019.01); *G06Q 10/0635* (2013.01)

(58) Field of Classification Search
CPC ...... G06F 16/27; G06F 16/273; G06F 16/275; G06F 16/278; G06F 16/2477; G06F 11/1469; G06F 16/219; G06F 16/22; G06F 16/2282; G06F 16/2433; G06F 16/24542; G06F 16/2471; G06F 16/258; G06F 16/282; G06F 2201/84; G06F 16/2365; G06F 16/1734; G06F 16/2379; G06F 9/4881; G06Q 10/06; G06Q 10/063; G06Q 10/0633; G06Q 10/0635
See application file for complete search history.

(56) References Cited

U.S. PATENT DOCUMENTS

| | | | | |
|---|---|---|---|---|
| 10,740,320 | B2 * | 8/2020 | Mace | G06F 16/2343 |
| 11,106,541 | B2 * | 8/2021 | Depoutovitch | G06F 11/2094 |
| 11,995,084 | B1 * | 5/2024 | Ayyappan | G06F 16/2264 |
| 12,373,755 | B2 * | 7/2025 | Kulkarni | G06Q 10/00 |

(Continued)

OTHER PUBLICATIONS

Kraft P., et al., "Apiary: A DBMS-Integrated Transactional Function-as-a-Service Framework," arXiv:2208.13068v2, Jun. 30, 2023, 14 pages.

(Continued)

*Primary Examiner* — Marcin R Filipczyk
(74) *Attorney, Agent, or Firm* — DLA Piper LLP (US)

(57) ABSTRACT

An operating system platform built on a transactional datastore is disclosed. The platform comprises a transactional datastore configured to store workflow state information, wherein services of the operating system are included in the transactional datastore. A workflow engine executes a workflow, wherein a portion of the workflow is annotated with decorators specifying infrastructure requirements. The platform includes a provenance database for storing historical versions of data and a scheduler for managing execution of periodic and event-driven tasks.

33 Claims, 17 Drawing Sheets

100

(56)     References Cited

U.S. PATENT DOCUMENTS

| | | | | |
|---|---|---|---|---|
| 2021/0034643 A1* | 2/2021 | Platt | ...................... | G06F 16/275 |
| 2021/0193297 A1* | 6/2021 | Buckland | ............... | G16H 40/20 |
| 2022/0066993 A1* | 3/2022 | Khanuja | ............ | G06F 16/2358 |

OTHER PUBLICATIONS

Kraft P., et al., "Epoxy: ACID Transactions Across Diverse Data Stores," Proceedings of the VLDB Endowment, 2023, vol. 16, No. 11, 13 pages.
Kumar D., et al., "Data Governance in a Database Operating System (DSOS)," Springer International Publishing, 2021, 18 pages.
Li Q., et al., "A Progress Report on DBOS: A Database-oriented Operating System," 12th Annual Conference on Innovative Data Systems Research, Jan. 9-12, 2022, 7 pages.
Li Q., et al., "R3: Record-Replay-Retroaction for Database-Backed Applications," Proceedings of the VLDB Endowment, 2023, vol. 16, No. 11, pp. 3085-3097.
Li Q., et al., "Transactions and Serverless Are Made for Each Other," Practice, Communications of the ACM, Dec. 2024, vol. 67, No. 12, pp. 52-56.
Li Q., et al., "Transactions and Serverless are Made for Each Other," Serverless, acmqueue, May-Jun. 2024, pp. 1-13.
Li Q., et al., "Transactions Make Debugging Easy," 13th Annual Conference on Innovative Data Systems Research, Jan. 8-11, 2023, 7 pages.
Skiadopoulosl A., et al., "DBOS: A DBMS-oriented Operating System," Proceedings of the VLDB Endowment, 2022, vol. 15, No. 1, pp. 21-30.

* cited by examiner

Figure 2:
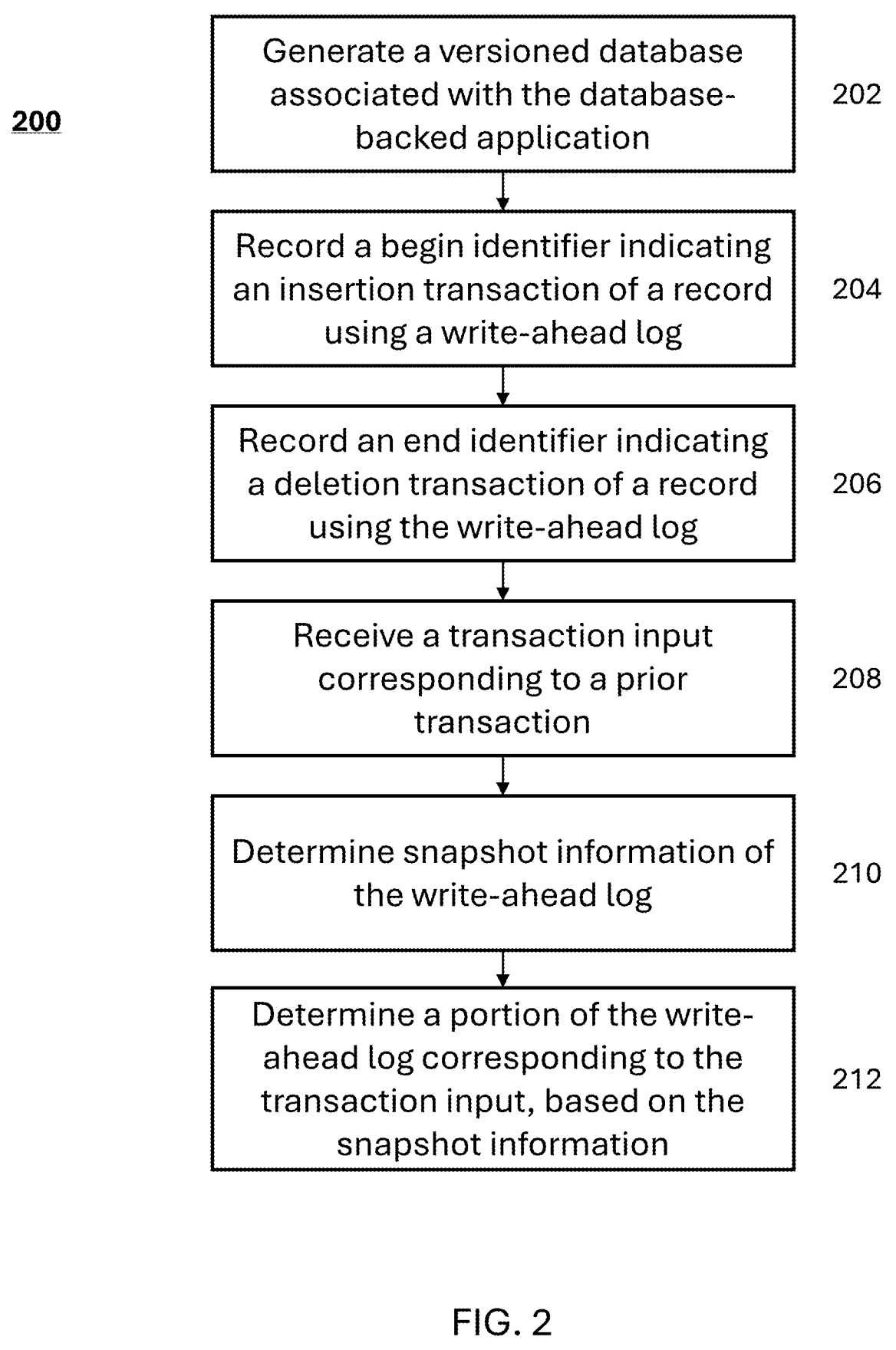

200

| | |
|---|---|
| Generate a versioned database associated with the database-backed application | 202 |
| Record a begin identifier indicating an insertion transaction of a record using a write-ahead log | 204 |
| Record an end identifier indicating a deletion transaction of a record using the write-ahead log | 206 |
| Receive a transaction input corresponding to a prior transaction | 208 |
| Determine snapshot information of the write-ahead log | 210 |
| Determine a portion of the write-ahead log corresponding to the transaction input, based on the snapshot information | 212 |

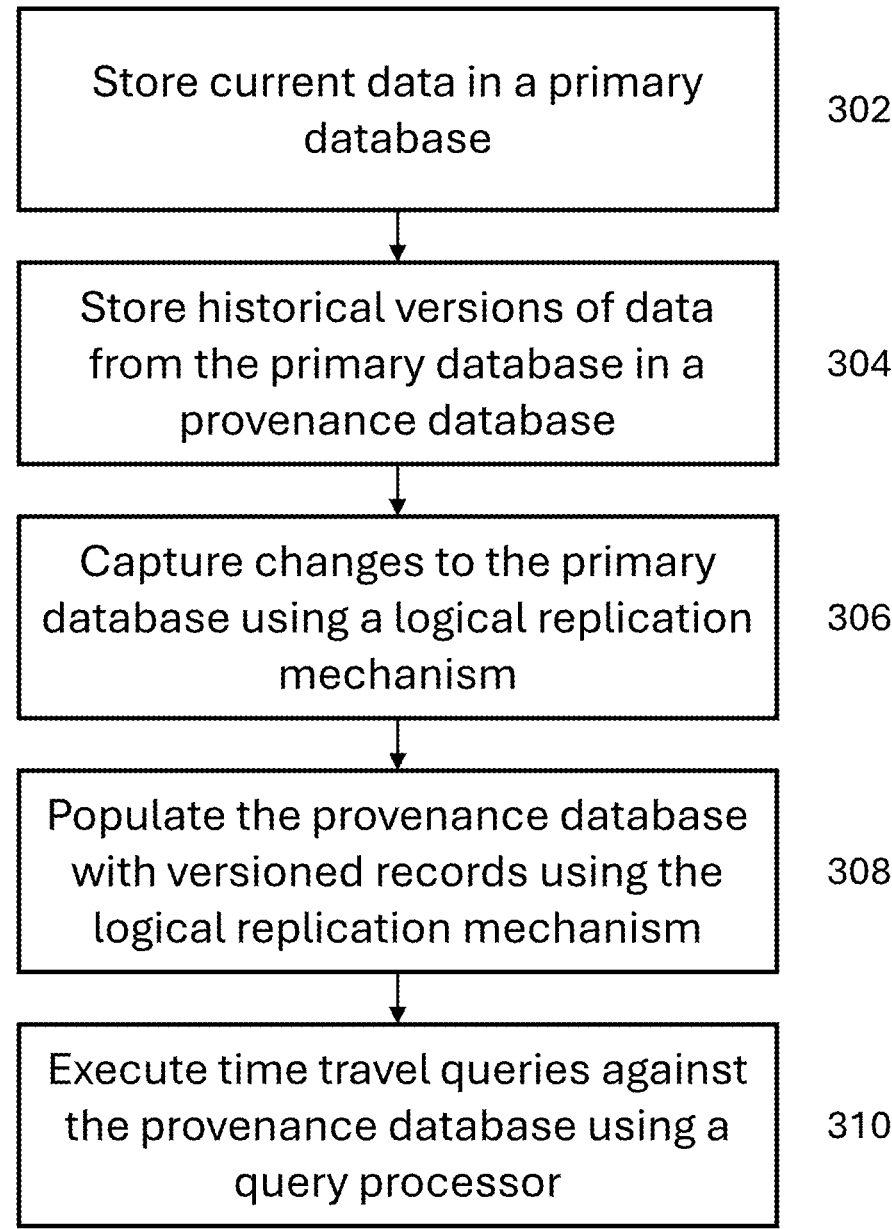

Store current data in a primary database — 302

Store historical versions of data from the primary database in a provenance database — 304

Capture changes to the primary database using a logical replication mechanism — 306

Populate the provenance database with versioned records using the logical replication mechanism — 308

Execute time travel queries against the provenance database using a query processor — 310

FIG. 3

Receive a workflow including one or more transactions in a database-based application — 402

Record an idempotency key associated with the workflow in the database — 404

For each transaction invoked in the workflow — 406

Execute the transaction — 408

Record an execution record in the transaction — 410

Commit the transaction, including its execution record, to the database — 412

400

```
// Synchronize column definitions from source user database to the provenance database
func (client *PGClient) migrateProvenanceColumns(ctx context.Context, srcClient IPostgresClient,
schemaName, tableName string) {

// First, check current column names and types from the source user DB.
  userColumnDefs, err := srcClient.GetColumnNameTypes(ctx, schemaName, tableName)

// Then, Check existing column names and types in the provenance DB.
  currColumnDefs, err := client.GetColumnNameTypes(ctx, schemaName, tableName)

// For each column in the user DB, check if it exists in the provenance DB.
  // If there's any new columns or column types that don't match with existing columns, we perform an
ALTER TABLE query.
  for _, newColumn := range userColumnDefs {
    // Check if the combination of column name and type exists in original columns
    exists := slices.Contains(currColumnDefs, newColumn)
    if exists {
      // If so, we don't need to make any changes.
      continue
    }

// Check if the column name exists in original columns.
    // If so, we need to change the column type.
    // If not, we need to add a new column.
    idx := slices.IndexFunc(currColumnDefs, func(c ColumnNameType) bool {
      return c.ColumnName == newColumn.ColumnName
    })

var query string
    if idx < 0 {
      // The column doesn't exist, so we add a new column.
```

FIG. 6

```
if newColumn.HasDefault {
    // If the new column has a default value, we add it to the query.
    query = fmt.Sprintf("ALTER TABLE %q.%q ADD COLUMN %q %s DEFAULT %s", schemaName,
tableName, newColumn.ColumnName, newColumn.ColumnType, newColumn.ColumnDefault)
    client.pool.Exec(ctx, query)
} else {
    // Otherwise, we add the column without a default value.
    query = fmt.Sprintf("ALTER TABLE %q.%q ADD COLUMN %q %s;", schemaName, tableName,
newColumn.ColumnName, newColumn.ColumnType)
    client.pool.Exec(ctx, query)
}
} else if currColumnDefs[idx].ColumnType != newColumn.ColumnType {
    // The column name exists, but types are different, so we try to migrate to the new type.
    // First, drop default value if exists, because it may cause trouble when we switch to a new default
type
    query = fmt.Sprintf("ALTER TABLE %q.%q ALTER COLUMN %q DROP DEFAULT;", schemaName,
tableName, newColumn.ColumnName)
    client.pool.Exec(ctx, query)

// Then, we change the column type.
    query = fmt.Sprintf("ALTER TABLE %q.%q ALTER COLUMN %q TYPE %s;", schemaName, tableName,
newColumn.ColumnName, newColumn.ColumnType)
    client.pool.Exec(ctx, query)
  }
 }
 return
}
```

FIG. 6 (continued)

```
// This function operates on a parsed syntax tree of a SQL query and returns a new syntax tree that
represents the time-travel clauses.
func timeTravelTransformation(
  table *pgq.RangeVar,
  txnidIndex uint16,
  xmaxIndex uint16,
  xiplistIndex uint16,
  curseqIndex uint16,
) (*pgq.Node, error) {

// Create nodes in the syntax tree for parameters: transaction ID, xmax, xip list, and current sequence
number.
  txnidParam := pgq.MakeParamRefNode(int32(txnidIndex), 0)
  xmaxParam := pgq.MakeParamRefNode(int32(xmaxIndex), 0)
  xiplistParam := pgq.MakeParamRefNode(int32(xiplistIndex), 0)
  curseqParam := pgq.MakeParamRefNode(int32(curseqIndex), 0)

// Create the table node for the table we are querying.
  tableFields := makeTableFields(table)

// Create nodes for the begin_xid, end_xid, begin_seq, and end_seq columns.
  beginxidNode := pgq.MakeColumnRefNode(append(tableFields, pgq.MakeStrNode("begin_xid")), 0)
  endxidNode := pgq.MakeColumnRefNode(append(tableFields, pgq.MakeStrNode("end_xid")), 0)
  beginseqNode := pgq.MakeColumnRefNode(append(tableFields, pgq.MakeStrNode("begin_seq")), 0)
  endseqNode := pgq.MakeColumnRefNode(append(tableFields, pgq.MakeStrNode("end_seq")), 0)

// The five time-travel clauses are:

// (begin_xid < xmax AND NOT begin_xid = ANY(xip_list))
  begin1 := pgq.MakeBoolExprNode(pgq.BoolExprType_AND_EXPR, []*pgq.Node{
    pgq.MakeAExprNode(pgq.A_Expr_Kind_AEXPR_OP, []*pgq.Node{pgq.MakeStrNode("<")},
beginxidNode, xmaxParam, 0),
    pgq.MakeBoolExprNode(pgq.BoolExprType_NOT_EXPR, []*pgq.Node{
      pgq.MakeAExprNode(pgq.A_Expr_Kind_AEXPR_OP_ANY, []*pgq.Node{pgq.MakeStrNode("=")},
beginxidNode, xiplistParam, 0),
    }, 0),
  }, 0)
```

FIG. 7

```
// (begin_xid = txn_id AND begin_seq <= curr_seq)
begin2 := pgq.MakeBoolExprNode(pgq.BoolExprType_AND_EXPR, []*pgq.Node{
   pgq.MakeAExprNode(pgq.A_Expr_Kind_AEXPR_OP, []*pgq.Node{pgq.MakeStrNode("=")},
beginxidNode, txnidParam, 0),
   pgq.MakeAExprNode(pgq.A_Expr_Kind_AEXPR_OP, []*pgq.Node{pgq.MakeStrNode("<=")},
beginseqNode, curseqParam, 0),
   }, 0)

// (end_xid >= xmax AND end_xid != txn_id)
end1 := pgq.MakeBoolExprNode(pgq.BoolExprType_AND_EXPR, []*pgq.Node{
   pgq.MakeAExprNode(pgq.A_Expr_Kind_AEXPR_OP, []*pgq.Node{pgq.MakeStrNode(">=")},
endxidNode, xmaxParam, 0),
   pgq.MakeAExprNode(pgq.A_Expr_Kind_AEXPR_OP, []*pgq.Node{pgq.MakeStrNode("!=")},
endxidNode, txnidParam, 0),
   }, 0)

// end_xid = ANY(xip_list)
end2 := pgq.MakeAExprNode(pgq.A_Expr_Kind_AEXPR_OP_ANY, []*pgq.Node{pgq.MakeStrNode("=")},
endxidNode, xiplistParam, 0)

// (end_xid = txn_id AND end_seq > curr_seq)
end3 := pgq.MakeBoolExprNode(pgq.BoolExprType_AND_EXPR, []*pgq.Node{
   pgq.MakeAExprNode(pgq.A_Expr_Kind_AEXPR_OP, []*pgq.Node{pgq.MakeStrNode("=")}, endxidNode,
txnidParam, 0),
   pgq.MakeAExprNode(pgq.A_Expr_Kind_AEXPR_OP, []*pgq.Node{pgq.MakeStrNode(">")},
endseqNode, curseqParam, 0),
   }, 0)

// Combine the clauses with OR operators to create the final time-travel clause.
checkBegin := pgq.MakeBoolExprNode(pgq.BoolExprType_OR_EXPR, []*pgq.Node{begin1, begin2}, 0)
checkEnd := pgq.MakeBoolExprNode(pgq.BoolExprType_OR_EXPR, []*pgq.Node{end1, end2, end3}, 0)

return pgq.MakeBoolExprNode(pgq.BoolExprType_AND_EXPR, []*pgq.Node{checkBegin, checkEnd}, 0),
nil
}
```

FIG. 7 (continued)

```
async workflow<T extends unknown[], R>(wf: Workflow<T, R>, params: InternalWorkflowParams,
callerUUID?: string, callerFunctionID?: number, ...args: T): Promise<WorkflowHandle<R>> {
   const workflowUUID: string = params.workflowUUID ? params.workflowUUID : this.#generateUUID();
   const presetUUID: boolean = params.workflowUUID ? true : false;

const wInfo = this.getWorkflowInfo(wf as Workflow<unknown[], unknown>);
   if (wInfo === undefined) {
     throw new DBOSNotRegisteredError(wf.name);
   }
   const wConfig = wInfo.config;

const wCtxt: WorkflowContextImpl = new WorkflowContextImpl(this, params.parentCtx,
workflowUUID, wConfig, wf.name, presetUUID, params.tempWfType, params.tempWfName);

const internalStatus: WorkflowStatusInternal = {
     workflowUUID: workflowUUID,
     status: StatusString.PENDING,
     name: wf.name,
     className: wCtxt.isTempWorkflow ? "" : getRegisteredMethodClassName(wf),
     configName: params.configuredInstance?.name || "",
     authenticatedUser: wCtxt.authenticatedUser,
     output: undefined,
     error: "",
     assumedRole: wCtxt.assumedRole,
     authenticatedRoles: wCtxt.authenticatedRoles,
     request: wCtxt.request,
     executorID: wCtxt.executorID,
     applicationVersion: wCtxt.applicationVersion,
     applicationID: wCtxt.applicationID,
     createdAt: Date.now(), // Remember the start time of this workflow
     maxRetries: wCtxt.maxRecoveryAttempts,
     recovery: params.recovery === true,
   };

if (wCtxt.isTempWorkflow) {
     internalStatus.name = `${DBOSExecutor.tempWorkflowName}-${wCtxt.tempWfOperationType}-
${wCtxt.tempWfOperationName}`;
     internalStatus.className = params.tempWfClass ?? "";
   }
```

FIG. 8

```
  // Synchronously set the workflow's status to PENDING and record workflow inputs (for non single-
transaction workflows).
  // We have to do it for all types of workflows because operation_outputs table has a foreign key
constraint on workflow status table.
  if (wCtxt.tempWfOperationType !== TempWorkflowType.transaction
    && wCtxt.tempWfOperationType !== TempWorkflowType.procedure
  ) {
    args = await this.systemDatabase.initWorkflowStatus(internalStatus, args);
  } const runWorkflow = async () => {
    let result: R;

// Execute the workflow.
    try {
      result = await wf.call(params.configuredInstance, wCtxt, ...args);
      internalStatus.output = result;
      internalStatus.status = StatusString.SUCCESS;
      this.systemDatabase.bufferWorkflowOutput(workflowUUID, internalStatus);
      wCtxt.span.setStatus({ code: SpanStatusCode.OK });
    } catch (err) {
      if (err instanceof DBOSWorkflowConflictUUIDError) {
        // Retrieve the handle and wait for the result.
        const retrievedHandle = this.retrieveWorkflow<R>(workflowUUID);
        result = await retrievedHandle.getResult();
        wCtxt.span.setAttribute("cached", true);
        wCtxt.span.setStatus({ code: SpanStatusCode.OK });
      } else {
        // Record the error.
        const e = err as Error & {dbos_already_logged?: boolean};
        this.logger.error(e);
        e.dbos_already_logged = true
        if (wCtxt.isTempWorkflow) {
          internalStatus.name = `${DBOSExecutor.tempWorkflowName}-${wCtxt.tempWfOperationType}-
${wCtxt.tempWfOperationName}`;
        }
        internalStatus.error = DBOSJSON.stringify(serializeError(e));
        internalStatus.status = StatusString.ERROR;
        await this.systemDatabase.recordWorkflowError(workflowUUID, internalStatus);
        wCtxt.span.setStatus({ code: SpanStatusCode.ERROR, message: e.message });
        throw err;
      }
    } finally {
      this.tracer.endSpan(wCtxt.span);
      if (wCtxt.tempWfOperationType === TempWorkflowType.transaction
        || wCtxt.tempWfOperationType === TempWorkflowType.procedure
      )
```

<div align="center">

FIG. 8 (continued)

</div>

```
{
        // For single-transaction workflows, asynchronously record
inputs.
        // We must buffer inputs after workflow status is
buffered/flushed because workflow_inputs table has a foreign key
reference to the workflow_status table.
        this.systemDatabase.bufferWorkflowInputs(workflowUUID, args);
      }
    }
    // Asynchronously flush the result buffer.
    if (wCtxt.resultBuffer.size > 0) {
      this.workflowResultBuffer.set(wCtxt.workflowUUID,
wCtxt.resultBuffer);
    }
    return result;
  };
  const workflowPromise: Promise<R> = runWorkflow();

// Need to await for the workflow and capture errors.
  const awaitWorkflowPromise = workflowPromise
    .catch((error) => {
      this.logger.debug("Captured error in awaitWorkflowPromise: " +
error);
    })
    .finally(() => {
      // Remove itself from pending workflow map.
      this.pendingWorkflowMap.delete(workflowUUID);
    });
  this.pendingWorkflowMap.set(workflowUUID, awaitWorkflowPromise);

// Return the normal handle that doesn't capture errors.
  return new InvokedHandle(this.systemDatabase, workflowPromise,
workflowUUID, wf.name, callerUUID, callerFunctionID);
}
```

FIG. 8 (continued)

```
async transaction<T extends unknown[], R>(txn: Transaction<T, R>, clsinst: ConfiguredInstance | null,
...args: T): Promise<R> {
    const txnInfo = this.#dbosExec.getTransactionInfo(txn as Transaction<unknown[], unknown>);
    if (txnInfo === undefined) {
      throw new DBOSNotRegisteredError(txn.name);
    }
    const readOnly = txnInfo.config.readOnly ?? false;
    let retryWaitMillis = 1;
    const backoffFactor = 1.5;
    const maxRetryWaitMs = 2000; // Maximum wait 2 seconds.
    const funcId = this.functionIDGetIncrement();
    const span: Span = this.#dbosExec.tracer.startSpan(
      txn.name,
      {
        operationUUID: this.workflowUUID,
        operationType: OperationType.TRANSACTION,
        authenticatedUser: this.authenticatedUser,
        assumedRole: this.assumedRole,
        authenticatedRoles: this.authenticatedRoles,
        readOnly: readOnly,
        isolationLevel: txnInfo.config.isolationLevel,
        executorID: this.executorID,
      },
      this.span,
    );

while (true) {
      let txn_snapshot = "invalid";
      const wrappedTransaction = async (client: UserDatabaseClient): Promise<R> => {
        const tCtxt = new TransactionContextImpl(
          this.#dbosExec.userDatabase.getName(), client, this,
          span, this.#dbosExec.logger, funcId, txn.name);

// If the UUID is preset, it is possible this execution previously happened. Check, and return its
original result if it did.
       // This guarantees OAOO.
        if (this.presetUUID) {
          const check: BufferedResult = await this.checkTxExecution<R>(client, funcId);
          txn_snapshot = check.txn_snapshot;
          if (check.output !== dbosNull) {
            tCtxt.span.setAttribute("cached", true);
            tCtxt.span.setStatus({ code: SpanStatusCode.OK });
            this.#dbosExec.tracer.endSpan(tCtxt.span);
            return check.output as R;
          }
        } else {
          // Collect snapshot information for read-only transactions and non-preset UUID transactions, if not
already collected above
          txn_snapshot = await this.retrieveTxSnapshot(client);
        }
```

FIG. 9

```
// For non-read-only transactions, flush the result buffer.
if (!readOnly) {
  await this.flushResultBuffer(client);
}

// Execute the user's transaction.
const result = await txn.call(clsinst, tCtxt, ...args);

// Record the execution, commit, and return.
if (readOnly) {
  // Buffer the output of read-only transactions instead of synchronously writing it.
  const readOutput: BufferedResult = {
    output: result,
    txn_snapshot: txn_snapshot,
    created_at: Date.now(),
  }
  this.resultBuffer.set(funcId, readOutput);
} else {
  // Synchronously record the output of write transactions and obtain the transaction ID.
  const pg_txn_id = await this.recordOutputTx<R>(client, funcId, txn_snapshot, result);
  tCtxt.span.setAttribute("pg_txn_id", pg_txn_id);
  this.resultBuffer.clear();
} return result;
};

try {
  const result = await this.#dbosExec.userDatabase.transaction(wrappedTransaction, txnInfo.config);
  span.setStatus({ code: SpanStatusCode.OK });
  this.#dbosExec.tracer.endSpan(span);
  return result;
} catch (err) {
  if (this.#dbosExec.userDatabase.isRetriableTransactionError(err)) {
    // serialization_failure in PostgreSQL
    span.addEvent("TXN SERIALIZATION FAILURE", { "retryWaitMillis": retryWaitMillis },
performance.now());
    // Retry serialization failures.
    await sleepms(retryWaitMillis);
    retryWaitMillis *= backoffFactor;
    retryWaitMillis = retryWaitMillis < maxRetryWaitMs ? retryWaitMillis : maxRetryWaitMs;
    continue;
  }
```

FIG. 9 (continued)

```
  // Record and throw other errors.
  const e: Error = err as Error;
  await this.#dbosExec.userDatabase.transaction(async (client: UserDatabaseClient) => {
    await this.flushResultBuffer(client);
    await this.recordErrorTx(client, funcId, txn_snapshot, e);
  }, { isolationLevel: IsolationLevel.ReadCommitted });
  this.resultBuffer.clear();
  span.setStatus({ code: SpanStatusCode.ERROR, message: e.message });
  this.#dbosExec.tracer.endSpan(span);
  throw err;
    }
  }
}

// Here is the code for executing communicators.
 async communicator<T extends unknown[], R>(commFn: Communicator<T, R>, clsInst:
ConfiguredInstance | null, ...args: T): Promise<R> {
   const commInfo = this.#dbosExec.getCommunicatorInfo(commFn as Communicator<unknown[],
unknown>);
   if (commInfo === undefined) {
     throw new DBOSNotRegisteredError(commFn.name);
   } const funcID = this.functionIDGetIncrement();
   const maxRetryIntervalSec = 3600 // Maximum retry interval: 1 hour const span: Span = this.#dbosExec.tracer.startSpan(
     commFn.name,
     {
       operationUUID: this.workflowUUID,
       operationType: OperationType.COMMUNICATOR,
       authenticatedUser: this.authenticatedUser,
       assumedRole: this.assumedRole,
       authenticatedRoles: this.authenticatedRoles,
       executorID: this.executorID,
       retriesAllowed: commInfo.config.retriesAllowed,
       intervalSeconds: commInfo.config.intervalSeconds,
       maxAttempts: commInfo.config.maxAttempts,
       backoffRate: commInfo.config.backoffRate,
     },
     this.span,
   );
```

FIG. 9 (continued)

```
    const ctxt: CommunicatorContextImpl = new CommunicatorContextImpl(this, funcID, span,
this.#dbosExec.logger, commInfo.config, commFn.name);

await this.#dbosExec.userDatabase.transaction(async (client: UserDatabaseClient) => {
      await this.flushResultBuffer(client);
    }, { isolationLevel: IsolationLevel.ReadCommitted });
    this.resultBuffer.clear();
// Check if this execution previously happened, returning its original result if it did.
    const check: R | DBOSNull = await
this.#dbosExec.systemDatabase.checkOperationOutput<R>(this.workflowUUID, ctxt.functionID);
    if (check !== dbosNull) {
      ctxt.span.setAttribute("cached", true);
      ctxt.span.setStatus({ code: SpanStatusCode.OK });
      this.#dbosExec.tracer.endSpan(ctxt.span);
      return check as R;
    }

// Execute the communicator function.  If it throws an exception, retry with exponential backoff.
    // After reaching the maximum number of retries, throw an DBOSError.
    let result: R | DBOSNull = dbosNull;
    let err: Error | DBOSNull = dbosNull;
    if (ctxt.retriesAllowed) {
      let numAttempts = 0;
      let intervalSeconds: number = ctxt.intervalSeconds;
      if (intervalSeconds > maxRetryIntervalSec) {
        this.logger.warn(`Communicator config interval exceeds maximum allowed interval, capped to
${maxRetryIntervalSec} seconds!`)
      }
      while (result === dbosNull && numAttempts++ < ctxt.maxAttempts) {
        try {
          result = await commFn.call(clsInst, ctxt, ...args);
        } catch (error) {
          const e = error as Error
          this.logger.warn(`Communicator error being automatically retried. Attempt ${numAttempts} of
${ctxt.maxAttempts}. ${e.stack}`);
          span.addEvent(`Communicator attempt ${numAttempts + 1} failed`, { "retryIntervalSeconds":
intervalSeconds, "error": (error as Error).message }, performance.now());
          if (numAttempts < ctxt.maxAttempts) {
            // Sleep for an interval, then increase the interval by backoffRate.
            // Cap at the maximum allowed retry interval.
            await sleepms(intervalSeconds * 1000);
```

FIG. 9 (continued)

```
        intervalSeconds *= ctxt.backoffRate;
        intervalSeconds = intervalSeconds < maxRetryIntervalSec ? intervalSeconds : maxRetryIntervalSec;
      }
    }
  }
} else {
  try {
    result = await commFn.call(clsInst, ctxt, ...args);
  } catch (error) {
    err = error as Error;
  }
}

// `result` can only be dbosNull when the communicator timed out
if (result === dbosNull) {
  // Record the error, then throw it.
  err = err === dbosNull ? new DBOSError("Communicator reached maximum retries.", 1) : err;
  await this.#dbosExec.systemDatabase.recordOperationError(this.workflowUUID, ctxt.functionID, err
as Error);
  ctxt.span.setStatus({ code: SpanStatusCode.ERROR, message: (err as Error).message });
  this.#dbosExec.tracer.endSpan(ctxt.span);
  throw err as Error;
} else {
  // Record the execution and return.
  await this.#dbosExec.systemDatabase.recordOperationOutput<R>(this.workflowUUID,
ctxt.functionID, result as R);
  ctxt.span.setStatus({ code: SpanStatusCode.OK });
  this.#dbosExec.tracer.endSpan(ctxt.span);
  return result as R;
}
}
```

FIG. 9 (continued)

DATABASE-CENTRIC OPERATING SYSTEM FOR DURABLE WORKFLOW

TECHNICAL FIELD

The present disclosure relates generally to database systems and methods for managing event processing in a database system.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. Various aspects of at least one example are discussed below with reference to the accompanying drawings, which are not intended to be drawn to scale. In the drawings:

FIG. 2 depicts an example flowchart illustrating a method for managing transactions in a versioned database associated with a database-backed application in accordance with an embodiment.

FIG. 3 depicts an illustrative flowchart showing a method for managing data through a primary and provenance database system in accordance with an embodiment.

FIG. 6 depicts example code for migrating provenance schema in accordance with an embodiment.

FIG. 7 depicts example code for time travel query transformation in accordance with an embodiment.

FIG. 8 depicts example code for executing a workflow in accordance with an embodiment.

FIG. 9 depicts example code for executing a transaction in accordance with an embodiment.

DETAILED DESCRIPTION

Figure 1:
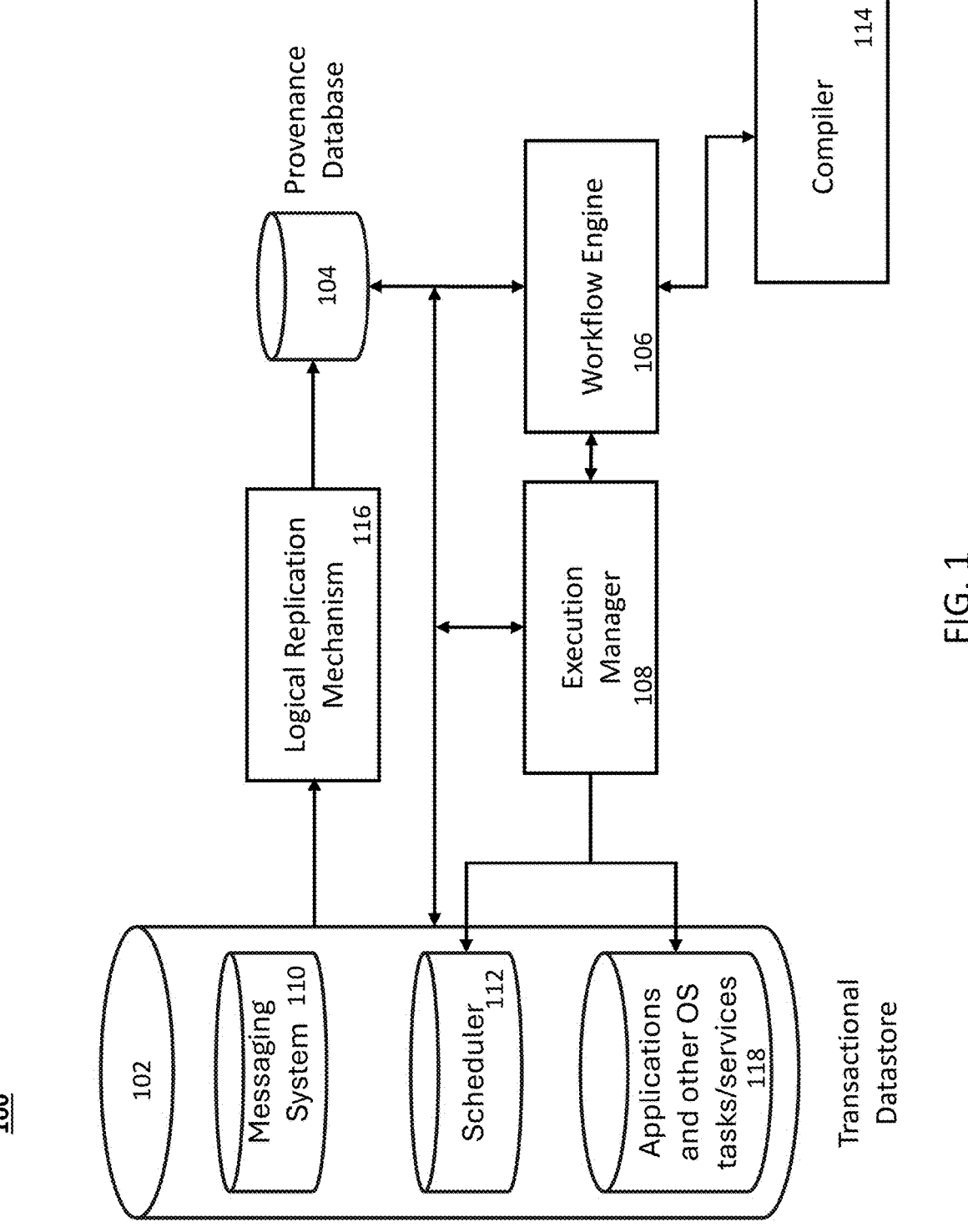
FIG. 1 depicts an exemplary block diagram of an illustrative operating system platform in accordance with an embodiment.

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Those having skill in the art can also translate from the plural form to the singular as is appropriate to the context and/or application. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices also can "consist essentially of" or "consist of" the various components and steps, and such terminology should be interpreted as defining essentially closed-member groups.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by $\frac{1}{10}$ of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art.

Operating systems have traditionally been designed to manage hardware resources and provide a standardized interface for applications to interact with the underlying computer system and/or hardware. These systems typically handle tasks such as process scheduling, memory management, file system operations, and device drivers. However, as software applications have become more complex and data-intensive, there has been a growing need for operating systems that can efficiently and flexibly handle large-scale data processing and workflow management.

Transactional datastores (e.g., relational databases) have been used as powerful tools for storing, organizing, and retrieving structured data. They can provide a robust foundation for many business applications and data-driven systems. However, integrating database functionality directly into the core of an operating system has not been widely explored or implemented.

As applications increasingly rely on distributed systems and cloud computing, there is a growing need for operating systems that can seamlessly and flexibly manage resources across multiple machines and provide built-in support for distributed workflows. Traditional operating systems were not designed with these requirements in mind, leading to challenges in scaling and managing modern distributed applications.

The growing importance of data provenance and auditing in many industries has created new challenges for operating system design. Traditional systems can lack built-in capabilities for tracking the lineage of data and providing comprehensive audit trails of system activities. This gap has led to the development of separate tools and systems for managing data provenance, adding complexity to overall system architectures.

As the volume and velocity of data continue to increase, there is a need for operating systems that can provide real-time processing capabilities and support for event-driven architectures. While specialized stream processing systems exist, integrating these capabilities directly into the operating system may provide significant performance benefits and simplify application development.

The present disclosure provides an operating system platform that integrates database functionality, state management, and workflow management. The operating system may be implemented by providing operating system services (e.g., process scheduling, memory management, file system operations, and device drivers) in the database. The database-centric operating system platform may include several components that work together to provide a unique approach to operating system design.

One such component may be a transactional datastore, which can be configured to store workflow state information. In some cases, the services of the operating system are built on this transactional datastore, allowing for efficient handling of large-scale data processing and workflow management.

Referring to FIG. 1, the operating system platform 100 may be an integrated system that combines various components to provide a comprehensive solution for managing workflows, data storage, and/or various operational tasks within an operating system environment. The operating system platform 100 may be configured to run on bare metal and/or on another system.

In some aspects, the operating system platform 100 may include a transactional datastore 102. The transactional datastore 102 may be configured to store workflow state information. The transactional datastore 102 may further store various types of data such as user profiles, system configuration settings, application 118 metadata, event logs, performance metrics, and/or resource allocation records. In some cases, the services of the operating system platform 100 may be built in the transactional datastore 102. This arrangement can allow for efficient handling of large-scale or scalable data processing and/or workflow management. The transactional datastore 102 may be, for example, a relational database and/or a No-SQL transactional datastore or any other type of datastore.

The operating system platform 100 may also include a workflow engine 106. The workflow engine 106 may be configured to execute a workflow. In some embodiments, a portion of the workflow can be annotated with decorators specifying infrastructure requirements. This may allow for automatic provisioning of infrastructure resources based on the decorators, simplifying the process of deploying and/or managing complex systems.

The workflow engine 106 may be configured to automatically provision infrastructure resources based on decorators specifying infrastructure requirements. A decorator may be a design pattern and/or a language feature that allows behavior to be added to an individual object, either statically and/or dynamically, without affecting the behavior of other objects from the same class. Decorators may be used to modify and/or enhance the functionality of functions, methods, and/or classes without directly altering their source code. Decorators may be implemented as special syntax that wraps around a function and/or class definition, providing a way to extend or modify the behavior of the wrapped code. Decorators may be particularly useful for adding metadata, logging, timing, or access control to existing code in a modular and/or reusable way. In some cases, a developer may annotate a portion of a workflow with decorators that specify the infrastructure requirements for that portion of the workflow. The workflow engine 106 may interpret these decorators and/or automatically provision the necessary resources when the workflow is executed. Decorators may simplify the process of deploying and/or managing complex systems.

In some aspects, the operating system platform 100 may support decorators in application code that define access roles assigned to a portion of the workflow. These decorators may be used to apply role-based access control to the workflows, restricting access to certain portions of the workflow based on the roles assigned to the users. For example, a decorator may specify that only users with an "admin" role can execute a certain portion of the workflow, which can prevent unauthorized users from performing sensitive operations and/or accessing sensitive data.

In some embodiments, a portion of a workflow may be annotated with decorators that specify the behavior of the workflow. The decorators may include various parameters that control the execution of the workflow. For example, at least one of the decorators may specify a maximum number of times the workflow may be automatically recovered. The decorators can provide a mechanism for limiting the number of recovery attempts for a workflow, preventing infinite retries in the case of a buggy workflow that repeatedly crashes the application.

In some cases, at least one of the decorators may specify a backoff rate between attempts to retry a step of the workflow. This can provide a mechanism for controlling the rate of retry attempts, which can allow for a gradual increase in the delay between retries. This can help to handle transient errors and/or prevent the system from being overwhelmed by rapid, repeated retry attempts.

In some cases, the operating system platform 100 can include an execution manager 108. The execution manager 108 may be configured to execute functions with configurable isolation levels. The functions may be database transactions. The execution manager 108 may provide robust mechanisms for managing data transactions and/or ensuring data integrity.

The execution manager 108 may be configured to support various isolation levels for database transactions. In some cases, the execution manager 108 may support at least one of read uncommitted, read committed, repeatable read, and serializable isolation levels. For example, a function with a serializable isolation level can provide the highest level of isolation, which can ensure that the function is executed as if it were the only function running in the system.

In some aspects, the execution manager 108 may be configured to accept user-defined functions that can automatically execute when a specific event occurs in a table, view, and/or foreign table. This feature may provide a mechanism for implementing reactive behavior within the database, which can allow for automatic responses to changes in data. For example, a user-defined function may be configured to automatically update a summary table whenever a new record is inserted into a related detail table.

In some aspects, the operating system platform 100 can include a compiler 114. The compiler 114 may be configured to automatically generate relational database stored procedures from high-level language code. This may allow for seamless integration of database operations into the operating system, which can improve performance and/or scalability.

In some embodiments, the operating system platform 100 may include a messaging system 110. The messaging system 110 may be configured to enable communication between workflows. The messaging system 110 may provide a robust mechanism for inter-process communication, facilitating the coordination and/or automation of complex business processes.

Together, these components can provide a database-centric operating system platform that may address challenges associated with managing complex, data-intensive workflows while providing robust support for distributed systems, declarative programming models, and/or real-time processing capabilities.

The compiler 114 may be configured to generate stored procedures in a dialect of SQL compatible with the transactional datastore 102. In some cases, the compiler 114 may automatically generate stored procedures from high-level language code, such as TypeScript and/or Python. As a result, developers may write code in a familiar, high-level language, while still benefiting from the performance and/or scalability advantages of stored procedures. The generated stored procedures may be executed within the transactional datastore 102, which can reduce the need for network round trips and/or improving performance.

The messaging system 110 may be configured to provide exactly-once delivery semantics for messages between workflows. In some cases, the messaging system 110 may ensure that every message sent from one workflow to another is delivered exactly once. Exactly-once delivery may be achieved through a combination of at-least-once delivery and idempotency. The messaging system 110 may facilitate the coordination and/or automation of complex business processes. For example, a workflow may send a message to another workflow to notify it of a completed task, and/or the messaging system 110 can ensure that the message is delivered, even in the face of network and/or processing failures.

In some aspects, the operating system platform 100 may further include a scheduler 112. The scheduler 112 may be configured to manage the execution of periodic and/or event-driven tasks. In some cases, the scheduler 112 may be used to schedule the execution of workflows and/or other tasks based on a specified schedule or in response to specific events. This can provide a mechanism for automating routine tasks and/or managing the execution of workflows in a timely and/or efficient manner.

In some embodiments, the operating system platform 100 can include a provenance database 104. The provenance database 104 may be configured for storing historical versions of data from the transactional datastore 102. As a result, the platform 100 may track changes to data over time, facilitate data auditing, and/or provide a historical record of data changes. In some cases, the provenance database 104 may be connected to the transactional datastore 102 via a logical replication mechanism 116, which can allow for data replication between the transactional datastore 102 and/or the provenance database 104.

The operating system platform 100 may include an object-relational mapping (ORM) layer. The ORM layer may be configured to map between object-oriented programming constructs and/or datastore structures. The ORM lay can allow a user to interact with the transactional datastore 102 using object-oriented programming languages, which can simplify the process of developing and/or maintaining database applications. In some cases, the ORM layer may support various ORM frameworks, such as SQLAlchemy, Drizzle, Knex, Prisma, and/or TypeORM.

In some aspects, the workflow engine 106 may be configured to provide exactly-once execution semantics for workflows by maintaining execution records in the transactional datastore 102. In some cases, the workflow engine 106 may assign a unique identifier to each instance of executing code to help ensure exactly-once execution. This unique identifier, which may be a universally unique identifier (UUID), may be used to track the execution of each workflow and/or prevent duplicate executions.

In some aspects, the workflow engine 106 may be configured to check for existing execution records before starting a workflow. This can help prevent duplicate executions of the same workflow, ensuring that each workflow is executed exactly once. For example, if a workflow is interrupted due to a system failure and/or other disruption, the workflow engine 106 may use the unique identifier to determine the last completed step of the workflow and/or resume execution from that point, rather than starting the workflow from the beginning. This can provide a robust mechanism for handling failures and/or ensuring the reliable execution of workflows.

The execution manager 108 may be configured to include execution records of a function (e.g., a transaction) during workflow operations to ensure atomicity. In some cases, the execution manager 108 may maintain a record of each transaction that is executed within the operating system platform 100. These execution records may be stored in the transactional datastore 102 and/or may include information such as the start time, end time, status, and/or result of each function. By including these execution records, the execution manager 108 may ensure that the function is executed atomically, meaning that either all of the operations in the function are completed successfully, or none of them are. This can provide a robust mechanism for ensuring data integrity and/or consistency within the operating system platform 100.

In some aspects, the workflow engine 106 may be configured to use idempotency keys when interacting with external systems to prevent duplicate actions in case of retries. An idempotency key can be a unique identifier that is associated with a specific operation or request. When the workflow engine 106 sends a request to an external system, it may include an idempotency key with the request. If the request fails and/or needs to be retried, the workflow engine 106 can resend the request with the same idempotency key. The workflow engine 106 may then only store a single response associated with the idempotency key. Duplicate responses may be ignored. This can prevent duplicate actions and/or ensure that each operation is performed exactly once, even in the face of network failures and/or other disruptions.

In some aspects, the workflow engine 106 of the operating system platform 100 may be configured to support workflows as code, providing durable execution and/or resilience to failures. This may involve workflows being comprised of steps, which are ordinary functions annotated with decorators. If a workflow is interrupted for any reason, such as a system crash or restart, the workflow engine 106 may be configured to automatically resume execution from the last completed step when the system restarts. This can provide a mechanism for ensuring that workflows always run to completion, even in the face of system failures or disruptions.

In some cases, the workflow engine 106 may be configured to support deterministic execution of workflows. This may involve workflow functions being deterministic, meaning that if called multiple times with the same inputs, they should produce the same result. This can be performed by recalling stored results from external systems.

The operating system platform 100 may further include a provenance database 104. The provenance database 104 may be configured to store multiple versions of each data record with corresponding transaction identifiers indicating when each version was created or superseded. In some cases, the provenance database 104 may maintain a historical record of each change to a data record, including the old value, the new value, and/or the transaction that made the change. This can provide a mechanism for tracking changes to data over time, facilitating data auditing and/or providing a historical record of data changes.

In some embodiments, the provenance database 104 may be configured to capture changes to the transactional database 102 using logical replication. Logical replication may include replicating data changes from one database (e.g., the transactional datastore 102) to another (e.g., the provenance database 104) by sending logical changes, such as insert, update, and/or delete operations, rather than physical changes. The provenance database 104 may capture changes to the transactional datastore 102 and/or store them in a format that allows for easy querying and/or analysis. The provenance database 104 can provide a mechanism for maintaining a historical record of data changes, facilitating data auditing and/or providing a historical record of data changes.

In some aspects, the operating system platform 100 may further comprise a time travel proxy configured to transform user queries to retrieve data from the provenance database 104 as of a specified point in time. The time travel proxy may be a component that intercepts user queries and/or modifies them to retrieve historical versions of data records from the provenance database 104. For example, a user may submit a query to retrieve the state of a data record as of a specific date and time. The time travel proxy can transform this query into a query that retrieves the version of the data record that was current at the specified date and time from the provenance database 104. This can provide a mechanism for querying historical data, facilitating data auditing and/or providing a historical record of data changes.

In some aspects, the provenance database 104 may be configured to store snapshot information. This can provide a mechanism for tracking the state of the data at different points in time. For example, a snapshot may be created each time a function is committed, which can capture the state of the data at the time of the function. The snapshot information may include a timestamp indicating when the snapshot was created, and/or a function identifier linking the snapshot to the function that caused the snapshot to be created. This can provide a detailed record of the history of the data, which can allow for precise tracking of changes over time.

In some embodiments, the provenance database 104 may be configured to enable auditing of database interactions by storing information about which functions modified specific data records. This can provide a mechanism for tracking the lineage of data, which can allow for detailed auditing of data changes. For example, each time a data record is modified, the provenance database 104 may store information about the function that made the modification, including the function identifier, the time of the modification, and/or the changes made to the data record.

The provenance database 104 may provide a mechanism for tracking changes to data over time, facilitating data auditing, and/or providing a historical record of data changes. By storing snapshot information and/or auditing information, the provenance database 104 can provide a detailed record of the history of the data, which can allow for precise tracking of changes over time and/or facilitating data auditing.

In some aspects, the operating system platform 100 may include developer tools and/or language support that enhance the development and/or debugging process. For instance, the operating system platform 100 may include a time travel debugger for TypeScript, Python, and/or other languages. The time travel debugger may be configured to allow developers to step back and/or forth through the execution of their code, inspecting the state of their program at each step. This can provide a powerful tool for understanding and/or debugging complex code behavior.

In some embodiments, the workflow engine 106 may be configured to support workflow queues and/or rate limiting. This may involve workflows being enqueued for execution and/or started in a first-in, first-out (FIFO) order. The workflow engine 106 may be configured to control the number of functions run in parallel, and/or the rate at which functions are started, through the use of concurrency limits and/or rate limits. The workflow engine 106 can manage system resources and/or preventing the system from being overwhelmed by too many concurrent executions.

In some cases, the operating system platform 100 may support integration with external systems, such as Kafka. This may involve running a function for each Kafka message received on specified topics, using the Kafka message's topic, partition, and/or offset to create a unique workflow id to ensure once and only once execution. As a result, Kafka may be integrated to the operating system platform 100 with external messaging systems facilitating the coordination and/or automation of complex processes.

In some cases, the operating system platform 100 may include features for code static analysis. Code static analysis may involve automatically examining the source code without executing it, to find potential issues such as security vulnerabilities, coding errors, and/or deviations from coding standards. This can provide a mechanism for improving the security and/or correctness of the code, helping to prevent bugs and/or vulnerabilities before the code is deployed.

In some embodiments, the operating system platform 100 may support ease of debugging and/or testing. This may involve providing a testing runtime that makes it easier to write unit tests for applications. The testing runtime may allow developers to invoke and/or test their application's functions individually, facilitating the identification and resolution of issues.

In some aspects, the operating system platform 100 may support multiple programming languages, such as TypeScript and/or Python. This can provide flexibility for developers to choose the language that best suits their needs and/or expertise. In some cases, the compiler 114 may be configured to automatically generate transactional datastore procedures from high-level language code written in these languages, allowing developers to write code in a familiar, high-level language, while still benefiting from the performance and/or scalability advantages of stored procedures.

Example System Embodiments

In some embodiments, an operating system platform can include a transactional datastore that can be configured to store workflow state information, wherein services of the operating system are built on the transactional datastore; a workflow engine that can be configured to execute a workflow, wherein a portion of the workflow is annotated with decorators specifying infrastructure requirements; a execution manager that can be configured to execute functions with configurable isolation levels; a compiler that can be configured to automatically generate transactional datastore stored procedures from high-level language code; and/or a messaging system that can be configured to enable communication between workflows.

In some embodiments, the transactional datastore can be configured to accept user-defined functions that can automatically execute when a specific event occurs in a table, view, and/or foreign table.

In some embodiments, the workflow engine can be configured to automatically provision infrastructure resources based on the decorators specifying infrastructure requirements.

In some embodiments, the execution manager can be configured to support at least one of read uncommitted, read committed, repeatable read, and/or serializable isolation levels.

In some embodiments, the compiler can be configured to generate stored procedures in a dialect of SQL compatible with the transactional datastore.

In some embodiments, the messaging system can be configured to provide exactly-once delivery semantics for messages between workflows.

In some embodiments, at least one of the decorators can define access roles assigned to the portion of the workflow.

In some embodiments, the platform can include a scheduler configured to manage execution of periodic and/or event-driven tasks.

In some embodiments, the platform can include a provenance database configured for storing historical versions of data from the transactional datastore.

In some embodiments, the platform can include an object-relational mapping (ORM) layer configured to map between object-oriented programming constructs and/ot transactional datastore structures, wherein the ORM layer may provide an abstraction for interacting with the transactional datastore using object-oriented programming languages.

In some embodiments, the ORM can include at least one of SQLAlchemy, Drizzle, Knex, Prisma, and/or TypeORM.

In some embodiments, at least one of the decorators can specify a maximum number of times the workflow may be automatically recovered.

In some embodiments, at least one of the decorators can specify a backoff rate between attempts to retry a step of the workflow.

In some embodiments, the workflow engine can be configured to provide exactly-once execution semantics for workflows by maintaining execution records in the transactional datastore.

In some embodiments, the workflow engine can be configured to assign a unique identifier to each instance of executing code to ensure exactly-once execution.

In some embodiments, the workflow engine can be configured to check for existing execution records before starting a workflow to prevent duplicate executions.

In some embodiments, the execution manager can be configured to include execution records in a transaction as the workflow operations to ensure atomicity.

In some embodiments, the workflow engine can be configured to use idempotency keys when interacting with external systems to prevent duplicate actions in case of retries.

In some embodiments, the provenance database can be configured to store multiple versions of each data record with corresponding transaction identifiers indicating when each version was created and/or superseded.

In some embodiments, the provenance database can be configured to capture changes to the transactional datastore using logical replication.

In some embodiments, the platform can include a time travel proxy configured to transform user queries to retrieve data from the provenance database as of a specified point in time.

In some embodiments, the provenance database can be configured to store snapshot information mapping transaction identifiers to timestamps.

In some embodiments, the provenance database can be configured to enable auditing of database interactions by storing information about which transactions modified specific data records.

In some embodiments, the functions can be database transactions.

In some embodiments, the operating system can run on bare metal.

In some embodiments, the transactional datastore can be a relational database.

In some embodiments, the transactional datastore can be a NoSQL transactional database.

Time-Versioned Database for Historical Queries

Relational databases can organize data into structured tables with predefined relationships between them. These tables can comprise of rows (e.g., records) and columns (e.g., attributes), which can allow for efficient storage and retrieval of information. Relational databases may utilize Structured Query Language (SQL) to manipulate and/or query data, which can enable complex operations such as joins, filters, and/or aggregations. They may enforce data integrity through constraints and/or support ACID (Atomicity, Consistency, Isolation, Durability) properties, which can ensure reliable transaction processing. Relational databases can be widely used in various applications due to their flexibility, scalability, and/or ability to handle complex data relationships. They can be a fundamental component of many information systems.

An operating system and/or application may be implemented on a database by utilizing the database as the underlying storage and/or retrieval mechanism for system or application data. In some aspects, the database can serve as a persistent layer that can manage structured information, while the operating system and/or application logic can interact with the database to read, write, and/or manipulate data as needed. The database may store configuration settings, user information, application state, and/or other relevant data, which can allow the operating system and/or application to maintain its state across restarts and/or provide consistent functionality.

Furthermore, the database may be leveraged to implement various features of the operating system and/or application, such as user authentication, access control, and/or data versioning. By utilizing database transactions, constraints, and/or indexing capabilities, the system may ensure data integrity, improve performance, and/or support complex queries. This database-centric approach may also facilitate easier backup, recovery, and/or scaling of the operating system or application, as well as enable advanced features like distributed processing and/or real-time analytics by leveraging the database's built-in capabilities.

The database system may include several system tables to track application execution history and/or data changes. These system tables may be stored in a system database. One of the system tables may be the workflow status table. This table may store workflow execution information and/or may include one or more of: data such as a workflow identifier (i.e., a unique identifier for the workflow execution), a status (e.g., a current status of the workflow execution such as PENDING, SUCCESS, and/or ERROR), a name (e.g., a function name of the workflow), a user who ran the workflow, an assumed rule of the user when running the workflow, all authenticated roles of the user, a request (e.g., the serialized HTTP request that triggered the workflow), an output (e.g., the serialized workflow output), an error (e.g., a serialized error thrown by the workflow, if any), a create timestamp (e.g., the time the workflow started), and an update timestamp (e.g., the latest time the workflow status was updated). The workflow identifier may be a universally unique identifier (UUID).

In addition to a workflow status table, the system may include other tables such as a table to store workflow input information, and/or a table to store the outputs of transaction functions.

The database system may also include a provenance database, which may be append-only. The provenance database may be linked to corresponding application database.

In the provenance database, each application database table may be extended to include records to support versioning. The records may include one or more of: a transaction ID that added the record, a transaction ID that deleted or superseded the record, a SQL statement sequence number within the transaction that added the record, and/or a SQL statement sequence number within the transaction that deleted and/or updated the record.

These additional columns may allow the system to track the complete history of each record, including when it was created, updated, and/or deleted. The provenance database may retain all versions of old rows, and/or even columns that have been dropped from the application table may be retained in the provenance table to preserve historical data.

The provenance database may enable features such as time travel queries, allowing users to query the database as it existed at a specific point in the past. This capability may be valuable for data analysis, debugging, and/or auditing purposes.

Database systems can be widely used to store and/or manage large amounts of data for various applications. As organizations accumulate vast amounts of data over time, there can be an increasing need to access and/or analyze historical data for purposes such as auditing, debugging, and/or trend analysis. However, traditional database systems can be primarily designed to store and/or query the current state of data, making it challenging to efficiently retrieve and analyze historical versions of data.

Time travel queries, which allow users to query a database as it existed at a specific point in the past, can have a valuable capability. However, implementing time travel functionality in database systems can present technical challenges. These challenges can include one or more of: efficiently storing and/or managing multiple versions of data, handling schema changes over time, and/or providing performant query execution on historical data.

Various approaches may be used to address the need for historical data access in database systems. These can include one or more of: maintaining full copies of the database at regular intervals, storing differences between versions, and using complex versioning schemes. However, many approaches can suffer from drawbacks such as one or more of: high storage overhead, slow query performance on historical data, and limited flexibility in the types of historical queries that can be executed.

Additionally, as applications become more complex and data-driven, there can be a growing need for robust debugging and/or auditing capabilities. Developers and/or system administrators may need to reconstruct the exact state of an application's data at a specific point in time to investigate issues and/or verify compliance with regulations. Traditional logging and/or backup systems may not provide sufficient granularity and/or ease of use for these purposes.

Furthermore, the increasing adoption of cloud-based and distributed database systems can introduce additional complexities in managing and/or querying historical data across multiple nodes or data centers. Ensuring consistency and/or performance in such distributed environments while providing time travel capabilities can present further technical challenges.

As organizations continue to rely heavily on data for decision-making and operational processes, there can be a need for improved systems and/or methods for efficiently storing, managing, and/or querying historical versions of data in database systems. Such improvements can: enhance data analysis capabilities, simplify debugging and/or auditing processes, and/or provide valuable insights into data evolution over time.

The present disclosure provides a database system designed to efficiently store, manage, and/or query historical versions of data. This system may include a primary database for storing current data and/or a provenance database for storing historical versions of data from the primary database. The system may also include a logical replication mechanism which can be configured to capture changes to the primary database and/or populate the provenance database with versioned records. Each versioned record may include a begin transaction identifier and/or an end transaction identifier, which can be used to execute time travel queries against the provenance database.

The logical replication mechanism may capture changes to the primary database in real-time, and/or can utilize a write-ahead log to determine snapshot information from the primary database and/or can transform the changes into records in the provenance database. The provenance database may further include additional columns in the versioned records to store metadata associated with each change, such as one or more of: a transaction identifier, a user identifier, an application identifier, and a type of operation that resulted in the change.

The system may also include a query processor which can be configured to execute time travel queries against the provenance database. The query processor may utilize snapshot information from the primary database to determine the visibility of the versioned records at a specified historical timestamp. The query processor may also translate a user-provided timestamp into snapshot information to execute the time travel queries.

The database system may provide several potential benefits, such as: enhanced data analysis capabilities, simplified debugging and/or auditing processes, and/or valuable insights into data evolution over time. The system may be particularly useful in database-backed applications where there is a need to access and/or analyze historical data for purposes such as auditing, debugging, and/or trend analysis.

Referring to FIG. 2, a method 200 of managing transactions in a database system may include generating 202 a versioned database associated with a database-backed application. This versioned database may be designed to store different versions of data as transactions are processed, and/or can provide a comprehensive record of data changes over time. The versioned database may be implemented using a relational database management system, such as PostgreSQL, MySQL, and/or Oracle, and/or may be structured to include tables corresponding to the data entities of the database-backed application. Each table in the versioned database may include additional columns for storing versioning information, such as a begin transaction identifier and/or an end transaction identifier.

The method 200 may include recording 204 a begin transaction identifier in a write-ahead log, which can mark the initiation of transaction inserting a new record. The write-ahead log may be a data structure used to log changes to the database before they are actually made, which can ensure data consistency and/or durability. The begin transaction identifier may be a unique identifier associated with the transaction that added the record, such as a transaction ID and/or a timestamp. This identifier may be recorded in the write-ahead log at the time of the insertion transaction, and/or can provide a record of when the record was added to the database.

The method 200 may include recording 206 an end transaction identifier in the write-ahead log, and/or can indicate the completion of a deletion transaction of a record. The end transaction identifier may be a unique identifier associated with the transaction that deleted the record and/or superseded the record with a new version. This identifier may be recorded in the write-ahead log at the time of the deletion transaction, which can provide a record of when the record was removed or updated in the database.

The method 200 may include receiving 208 a transaction input corresponding to a prior transaction. This transaction input may be a query and/or a command issued by a user and/or an application, requesting to access and/or manipulate data in the versioned database. The transaction input may specify a particular point in time and/or a range of time, which can allow for time travel queries that retrieve data as it existed at a specific historical point in time. The time in question may be defined by a timestamp and/or transaction ID.

The method 200 may include determining 210 snapshot information from the write-ahead log. The snapshot information may include information about the state of the database at a specific point in time, such as: the transaction IDs that were committed before this time and/or the transaction IDs that were in progress and/or had not started at this time. This snapshot information may be used to determine the visibility of the versioned records at the specified historical timestamp, which can enable accurate and efficient retrieval of historical data.

The method 200 may include determining 212 a portion of the write-ahead log corresponding to the transaction input, which can be based on the snapshot information. This portion of the write-ahead log may include the changes that were made to the database during the specified historical timestamp and/or timeframe, as recorded in the write-ahead log.

In some cases, the process may further involve committing the portion of the write-ahead log to the versioned database. This may involve updating the versioned database with the changes recorded in the portion of the write-ahead log, which can ensure that the versioned database accurately reflects the state of the database at the specified historical timestamp. This may enable instantaneous time travel queries with no more overhead than a standard read operation, which can provide a powerful tool for data analysis, debugging, and/or auditing.

In some cases, the write-ahead log may include metadata associated with each transaction. This metadata may comprise at least one: of a transaction identifier, a timestamp, a user identifier, and an application identifier. This metadata may provide additional context for each transaction, which can facilitate more detailed analysis and/or auditing of the database operations.

In some aspects, the system may utilize PostgreSQL's snapshot information (e.g., xmin, xmax, and xip_list) to efficiently represent which transactions have been committed at any point in time. The xmin and xmax alues can represent the range of transaction IDs that have been committed, while the xip_list can represent transaction IDs that can be in progress and/or have not started yet. This snapshot information can be used to determine the visibility of versioned records at a specific point in time, which can enable the system to execute time travel queries with high accuracy and/or efficiency.

In some cases, the system may be configured to capture and/or store schema changes in the versioned database to support queries across different historical database schemas.

This may involve recording schema changes in the write-ahead log and/or updating the versioned database with the schema changes. This may allow users to query the database as it existed at a specific point in time, even if the database schema has changed since then. This can be particularly useful in scenarios where the database schema evolves over time, such as in agile development environments and/or in applications that require schema evolution.

Furthermore, the system may be configured to generate audit trails by querying the versioned database to track changes made to specific records over time. This may include executing queries against the versioned database to retrieve the historical versions of specific records, and/or recording the query results in an audit log. This feature may provide valuable insights into the data evolution and/or changes over time, and/or may be particularly useful for auditing, compliance, and/or forensic analysis purposes.

In some embodiments, the system may implement a purge mechanism to remove historical data from the versioned database based on predefined retention policies and the metadata. The purge mechanism may be configured to automatically delete records that are older than a certain age, and/or records that meet certain criteria specified in the retention policies. This may help to manage the size of the versioned database and/or ensure that it does not become too large and/or unwieldy. The purge mechanism may also be configured to archive the purged data to a separate storage system for long-term retention, which can allow for the possibility of retrieving the data if needed in the future. This feature may provide a balance between maintaining a comprehensive record of data changes and managing the storage resources effectively.

Referring to FIG. 3, a method 300 for executing time travel queries is illustrated in accordance with an embodiment. The time-versioned database system may include a primary database for storing 302 current data. The primary database, in some aspects, may be a relational database that stores the current state of data for a database-backed application. The primary database may be configured to store a variety of data types, including but not limited to: text, numbers, dates, and/or binary data. The primary database may include application data. The primary database may support various operations such as insertions, deletions, updates, and/or queries, which can allow for flexible and efficient data management.

The primary database may be structured into tables, where each table can represent a different entity and/or concept in a database-backed application. Entries in the tables may represent records and/or their associated attributes. The primary database may also support relationships between tables, such as: one-to-one, one-to-many, and many-to-many relationships, enabling complex data modeling and/or query capabilities.

In some cases, the primary database may be implemented using a database management system (DBMS), such as PostgreSQL, MySQL, Oracle, and/or SQL Server. The DBMS may provide various features and/or capabilities, such as: transaction management, indexing, query optimization, and/or data integrity enforcement, which can enhance the performance and/or reliability of the primary database.

The primary database may also support ACID properties, which can ensure reliable and/or consistent transaction processing. Atomicity can ensure that each transaction is treated as a single, indivisible unit of work, where either all changes made in a transaction are committed to the database, or none are. Consistency can help ensure that each transaction brings the database from one valid state to another, and/or can maintain the integrity of the data. Isolation can help ensure that concurrent transactions do not interfere with each other, and/or can provide each transaction with a "snapshot" of the database and/or can help ensure that the results of a transaction are not visible to other transactions until the transaction is committed. Durability can help ensure that once a transaction is committed, its changes to the database persist, even in the event of a system failure.

In some aspects, the primary database may be configured to support logical replication, which can include a method of replicating data changes from one database to another. Logical replication may involve capturing changes to the primary database as they occur, and/or applying these changes to a replica database. This may enable the system to replicate 304 historical data of the primary database in a provenance database.

Referring to FIG. 2, the time-versioned database system may include a logical replication mechanism configured to capture 306 changes to the primary database and/or populate the provenance database with versioned records. The logical replication mechanism, in some aspects, may be based on the Postgres logical replication feature, which can allow for the capture of changes to the primary database by exposing write-ahead-log (WAL) data. The WAL data may include the transaction ID, the operation of the record such as insert/delete/update, and/or the row value of the record.

In some cases, the logical replication mechanism may be implemented as a special exporter configured to read the WAL data, enhance it with version information, and/or update the corresponding provenance table in the provenance database. The exporter may process WAL records sequentially and/or can handle different types of operations. For example, for an insert operation, the exporter may append 308 the new record into the provenance table, setting the begin transaction identifier to the transaction ID from the WAL record. In some embodiments, in an insert operation, the end transaction identifier may be set to a very large value, outside an expected normal value for operation.

In another example, for a delete operation, the exporter may find the latest record in the provenance table for a transaction (e.g., where the end transaction identifier is set to the very large value) and/or update the end transaction identifier to the transaction ID from the WAL record.

In a third example, for an update operation, the exporter may first perform a delete operation for the latest version of the record and/or then perform an insert operation to add the new version of the record.

This approach can allow the logical replication mechanism to capture all versions of each data record in the primary database, along with the start and/or end logical timestamps of each version, which can enable the system to query at a given point in time which version was visible for each record.

The time-versioned database system may also include a query processor configured to execute 310 time travel queries against the provenance database. The query processor, in some aspects, may utilize snapshot information from the primary database to determine the visibility of the versioned records at a specified historical timestamp. The snapshot information may include transaction IDs that are committed before the specified timestamp and/or transaction IDs that are in progress and/or have not started at the specified timestamp.

In some cases, the query processor may be implemented as a time travel proxy, which can parse user queries and/or appends SQL predicates to each query based on the snapshot information. This can allow users to easily query the provenance database as if they were querying the primary database at a specific point in time. As a result, instantaneous time travel queries may be performed with no more overhead than a standard read operation.

The time-versioned database system may also include advanced query capabilities that can allow for more complex data analysis. In some cases, the query processor may be configured to execute filtered queries that can compare data between two specified historical timestamps. This may involve executing a query against the provenance database to retrieve data as it existed at the first specified historical timestamp, executing the same query against the provenance database to retrieve data as it existed at the second specified historical timestamp, and/or comparing the results of the two queries. This feature may allow users to easily compare the state of the data at two different points in time, which can provide insights into data trends and/or changes over time.

In some aspects, the time-versioned database system may also include an access control mechanism which can be configured to enforce user-specific permissions on historical data access based on roles and/or time ranges. The access control mechanism may be implemented as a set of rules and/or policies that can determine which users are allowed to access which historical data and/or at what times. For example, a user with an administrator role may be allowed to access all historical data at any time, while a user with a regular user role may only be allowed to access historical data within a certain time range. This feature may enhance the security and/or privacy of the data by ensuring that only authorized users can access historical data.

Furthermore, the time-versioned database system may be configured to support historical schema changes. In some cases, the provenance database may be configured to store multiple versions of schema changes, which can allow the query processor to execute time travel queries across different historical database schemas. This feature may allow users to query the database as it existed at a specific point in time, even if the database schema has changed since then. This can be useful in scenarios where the database schema evolves over time, such as in agile development environments and/or in applications that require schema evolution.

In some aspects, the time-versioned database system may utilize a framework to automatically keep track of the snapshot information to timestamp mapping as it executes transaction functions. This feature may facilitate the execution of time travel queries by providing the necessary snapshot information for determining the visibility of versioned records at a specified historical timestamp. The framework may be configured to work seamlessly with the primary database and/or the provenance database, which can provide a unified interface for managing transactions and/or executing queries.

In some embodiments, the time-versioned database system may also enable time travel debugging capabilities. This feature may allow developers to replay any cloud trace locally on their development machine, which can provide a powerful tool for debugging and/or troubleshooting. The time travel debugging feature may leverage the provenance database to execute the code against the database state as it was at the time of the original execution, which can provide a faithful replay of the original execution environment. This feature may be useful for reproducing issues that occur in a production environment, and/or can allow developers to investigate and fix bugs more effectively.

In some aspects, the time travel debugging feature may also allow developers to modify their code during the debugging session and/or execute it as if the new code ran in the past. This feature may enable developers to test different code changes and/or observe their effects on the historical data. As a result, other changes in the system may be controlled. The ability to modify code during time travel debugging may be facilitated by the versioned database system's ability to handle multiple versions of schema changes, which can allow the system to execute queries across different historical database schemas.

In some cases, the time-versioned database system may also utilize the provenance database for auditing database interactions. The provenance database may store a comprehensive record of all changes made to the primary database, which can include the history of interactions with the PostgreSQL database and/or any PostgreSQL wire protocol-compatible DBMS. This feature may help enable users to query the provenance database to check who changed what data when, and/or can provide a powerful tool for auditing and compliance. The auditing feature may leverage the metadata stored in the versioned records, such as the transaction identifier, the user identifier, the application identifier, and/or the type of operation, to provide detailed information about each change. This feature may be useful for applications that require strict data governance and/or compliance with regulatory standards.

In some embodiments, the time-versioned database system may return recorded outputs for methods that do not interact with the database, such as communicators, rather than re-executing them. This may prevent unexpected side effects during the debugging session, such as sending an email and/or making a network request. This feature may provide a balance between accurately reproducing the original execution environment and/or preventing unwanted side effects, which can enhance the usability and/or effectiveness of the time travel debugging feature.

In some embodiments, the time-versioned database system may be integrated with a development environment, such as Visual Studio Code (VS Code), to provide time travel debugging capabilities. This integration may be facilitated by a VS Code extension, which may be designed to interact with the time-versioned database system and/or provide a user-friendly interface for time travel debugging.

Example Time Travel Embodiments

In some embodiments, a time-versioned database system includes a first database configured as a primary database for storing current data; a second database configured as a provenance database for storing historical versions of data from the primary database; a logical replication mechanism configured to capture changes to the first database and populate the second database with versioned records, each versioned record including a begin transaction identifier and an end transaction identifier; and a query processor configured to execute time travel queries against the second database by selecting versioned records visible at a specified historical timestamp based on the begin and end transaction identifiers.

In some embodiments, the logical replication mechanism can be further configured to capture changes to the first database in real-time.

In some embodiments, the logical replication mechanism can capture changes by utilizing a write-ahead-log data to determine snapshot information from the first database and/or transforming the changes into records in the second database.

In some embodiments, the second database can further comprise additional columns in the versioned records to store metadata associated with each change.

In some embodiments, the metadata can include at least one of a transaction identifier, a user identifier, an application identifier, or a type of operation that resulted in the change.

In some embodiments, the query processor can be further configured to utilize snapshot information from the primary database to determine the visibility of the versioned records at the specified historical timestamp; and/or translate a user provided timestamp into snapshot information.

In some embodiments, the snapshot information can comprise transaction identifiers that are committed before the specified historical timestamp and/or transaction identifiers that are in progress or have not started at the specified historical timestamp.

In some embodiments, the query processor can be further configured to execute filtered queries that compare data between two specified historical timestamps.

In some embodiments, the system can include an access control mechanism configured to enforce user-specific permissions on historical data access based on roles and/or time ranges.

In some embodiments, the second database can be configured to store multiple versions of schema changes, allowing the query processor to execute time travel queries across different historical database schemas.

In some embodiments, a method for capturing previous states of a database-backed application can include: generating a versioned database associated with the database-backed application; recording a begin identifier indicating an insertion transaction of a record associated with the generation utilizing a write-ahead log; recording an end identifier indicating a deletion transaction of a record associated utilizing the write-ahead log; receiving a transaction input corresponding to a prior transaction; determining snapshot information of the write-ahead log; and/or determining a portion of write-ahead log corresponding to the transaction input, based on the snapshot information.

In some embodiments, the method can include committing the portion of the write-ahead log to the versioned database.

In some embodiments, the transaction input can include a query associated with a range of prior transactions, wherein the prior transaction is in the range of prior transactions.

In some embodiments, the write-ahead log can include metadata associated with each transaction, the metadata comprising at least one of a transaction identifier, a timestamp, a user identifier, and/or an application identifier.

In some embodiments, the method can include executing the query against the versioned database to retrieve data as it existed at a specified historical point in time.

In some embodiments, generating the versioned database can include creating a separate table for each table in the database-backed application, each separate table including additional columns for storing versioning information.

In some embodiments, the method can further include capturing and/or storing schema changes in the versioned database to support queries across different historical database schemas.

In some embodiments, the method can include implementing a purge mechanism to remove historical data from the versioned database based on predefined retention policies and/or the metadata.

In some embodiments, the method can further include generating audit trails by querying the versioned database to track changes made to specific records over time.

In some embodiments, a method for operating a time-versioned database system can include: storing current data in a primary database; storing historical versions of data from the primary database in a provenance database; capturing changes to the primary database using a logical replication mechanism; populating the provenance database with versioned records using the logical replication mechanism, wherein each versioned record includes a begin transaction identifier and/or an end transaction identifier; and/or executing time travel queries against the provenance database using a query processor, wherein executing the time travel queries can comprise selecting versioned records visible at a specified historical timestamp based on the begin and/or end transaction identifiers.

Once and Only Once Execution

Durable execution frameworks may seek to ensure reliable code execution in the face of infrastructure disruptions. However, while durable execution offers significant benefits, it may not inherently provide transactional correctness and/or exactly-once semantics.

Many applications, such as those built on event streaming systems and/or distributed data processing platforms, require stronger guarantees than simple durability. These applications may need to ensure that operations are processed exactly once, without under- or over-counting events. Achieving exactly-once semantics can be notoriously challenging due to the theoretical impossibility of perfect message delivery verification and/or internal record keeping.

Existing approaches to solving this problem can involve complex architectures and/or custom implementations of idempotent operations. Developers may wish to carefully design their systems to handle potential duplicates and/or ensure that repeated executions of the same operation do not result in unintended side effects. This complexity can increase the likelihood of errors and/or can make it difficult to reason about the correctness of distributed applications.

The present disclosure illustrates systems and methods for transactional execution of workflows in database-based applications. These systems and methods may be designed to ensure exactly-once semantics for database transactions/functions and/or external system calls within workflows. In some embodiments, the system may include a processor and/or a non-transitory, processor-readable storage medium. The storage medium may contain programming instructions that, when executed, cause the processor to receive a workflow comprising one or more transactions, record an idempotency key associated with the workflow in a database, and/or execute each transaction within the workflow. The execution of each transaction may include recording an execution record for the transaction as part of the transaction itself, and/or committing the transaction, including the execution record, to the database.

In some embodiments, the system may be designed to handle workflows that include both database transactions and calls to external systems. The system may provide a unified model for transactional execution across different types of operations. This may offer significant benefits in terms of code simplicity, reliability, and/or performance, such as for applications that require strong consistency guarantees.

Figure 4:
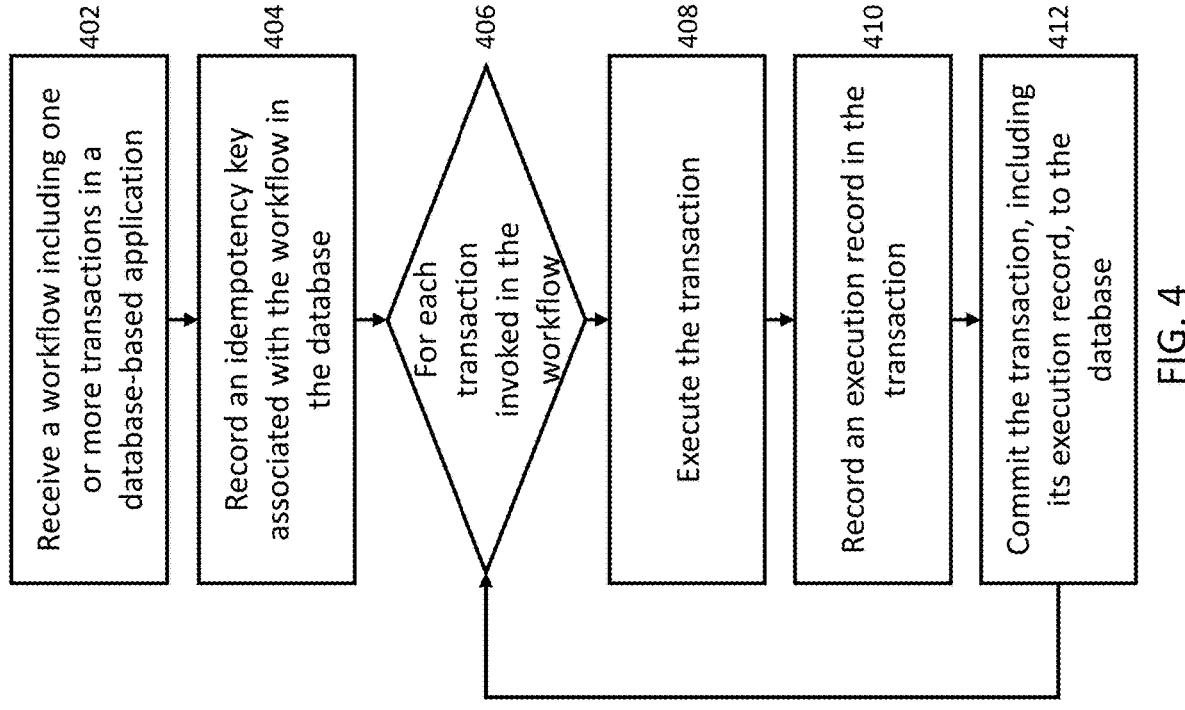
FIG. 4 depicts an illustrative flowchart of a method for transactional execution of workflows in accordance with an embodiment.

Referring to FIG. 4, a method 400 for transactional execution of workflows is illustrated. The method 400 may including receiving 402 a workflow comprising one or more transactions in a database-based application. The workflow may be any sequence of operations that are to be executed in a specific order, and each transaction within the workflow may represent a single operation or a group of operations that are to be executed as a unit. The transactions may be associated with various types of operations, such as database operations, calls to external systems, and/or any other types of operations that may be performed in a database-based application.

The method 400 may include recording 404 an idempotency key associated with the workflow in the database. The idempotency key may be a unique identifier that is associated with the workflow and/or that can be used to ensure that each transaction within the workflow is executed exactly once. In some cases, the idempotency key may be generated based on various factors, such as the identity of the workflow, the current state of the workflow, the current time, and/or any other suitable factors. In some aspects, the idempotency key may be a universally unique identifier (UUID). A UUID can be a 128-bit number used to identify information in computer systems, and can be represented as 32 hexadecimal digits displayed in five groups separated by hyphens.

In some embodiments, the system may be configured to determine if the idempotency key is already recorded in the database. If the idempotency key is already recorded, the system may resume the workflow using previously computed data. This approach may provide a robust mechanism for ensuring exactly-once semantics in distributed systems.

The method 400 may include a loop 406, which iterates for each transaction invoked in the workflow. Within the loop 406, one more actions are performed for each transaction. The loop may include executing 408 the transaction. This may involve performing the operations associated with the transaction, such as reading, writing, or deleting data in the database, calling an external system, or performing any other types of operations.

The method 400 may include recording 410 an execution record for the transaction in the transaction. The execution record may include information about the execution of the transaction, such as the idempotency key associated with the workflow, a transaction ID of the transaction, the state of the transaction before and after its execution, the results of the transaction, a timestamp, and/or any other suitable information. The execution record may be recorded as part of the transaction itself, which can help ensure that the execution record is committed to the database if and only if the transaction is successfully executed.

The method may include committing 412 the transaction, which can include its execution record, to the database. This may involve writing the results of the transaction and the execution record to the database, and/or updating the state of the workflow to reflect the successful execution of the transaction. If the transaction fails for any reason, the commit step 412 may not be performed, and/or the transaction and its execution record may not be written to the database. In such cases, the transaction may be retried in a subsequent iteration of the loop 406.

In some embodiments, the method 400 may also include additional steps and/or variations. For example, the method 400 may include steps for handling failures and/or interruptions in the execution of the workflow, such as steps for retrying failed transactions, steps for resuming the workflow from the point of interruption, and/or steps for handling duplicate transactions. The method 400 may also include steps for handling workflows that can include calls to external systems, such as steps for recording the calls in the database, steps for ensuring exactly-once semantics for the calls, and/or steps for handling failures or interruptions in the calls. These and other variations and modifications are within the scope of the present disclosure.

Each of the transactions within the workflow may be implemented with atomicity, consistency, isolation, and/or durability (ACID) properties. These properties may help ensure that each transaction is executed in a reliable and/or consistent manner, even in the presence of failures or interruptions. For example, the atomicity property may help ensure that each transaction is executed as a single, indivisible unit of work, such that either all of the operations within the transaction are executed, or none of them are. The consistency property may help ensure that each transaction brings the database from one consistent state to another. The isolation property may help ensure that each transaction is executed in isolation from other transactions, such that the intermediate states of the transaction are not visible to other transactions. The durability property may help ensure that once a transaction is committed, its effects are permanent and/or survive any subsequent failures or interruptions.

In some cases, the system may be configured to handle calls to external systems within the workflow. For instance, the programming instructions may cause the processor to execute a call to an external system. This call may involve sending a request to the external system, receiving a response from the external system, and/or performing any other types of operations that involve the external system. The call may be associated with a particular transaction within the workflow, and/or it may be a separate operation that is not part of any transaction.

Following the execution of the call, the system may record the call in the database. This may involve creating a record that can include information about the call, such as the idempotency key associated with the call, the state of the call before and after its execution, the results of the call, and/or any other suitable information. The record of the call may be stored in the database along with the records of the transactions within the workflow, which can provide a comprehensive record of all operations performed during the execution of the workflow.

In some aspects, the system may be designed to determine if the call to the external system is already recorded in the database. This determination may be based on the idempotency key associated with the call, and/or on any other suitable factors. If the call is already recorded, the system may resume the workflow using the output from the call as previously computed. This approach may ensure that each call to an external system is executed exactly once, even in the presence of failures or interruptions. This may provide a robust mechanism for helping to ensure exactly-once semantics for calls to external systems, which can potentially simplify the development of reliable, transactionally correct applications.

In addition to handling transactions and calls to external systems, the system may be configured to log each step of the workflow in the database. This may involve creating a log entry for each step, which may include information about the step, such as the idempotency key associated with the step, the state of the step before and after its execution, the results of the step, and/or any other suitable information. The log entries may be stored in the database along with the records of the transactions and the calls, which can help provide a comprehensive record of the execution of the workflow. This logging mechanism may enable the system to resume the workflow from the point of interruption in case of a system failure, which can potentially improve the reliability and/or robustness of the system.

The provenance database, as described herein, may function as a log of all performed steps of a transaction.

In some aspects, the system may implement additional optimizations and/or processes for handling different types of workflows and/or transactions. For instance, for read-only transactions, the system may buffer the output instead of synchronously writing it to the database. This approach may avoid converting cheap reads into expensive writes, thus potentially improving the performance of the system. The buffered output may be stored in a temporary storage area, such as a memory buffer, until a proceeding write transaction occurs. At that point, the system may commit the buffer to the database, which can help ensure that the results of the read-only transactions are properly recorded. As a result, a plurality of read-only transactions may be written in a batch.

In some cases, the system may log the start time of the workflow in the database. This may provide a timestamp that can be used to track the progress of the workflow, identify any delays or interruptions, and/or perform any other suitable operations.

In some embodiments, the system may synchronously set the workflow's status to pending and/or record the workflow inputs for non single-transaction workflows. This may be done because certain tables in the database, such as an operation output table, may have a foreign key constraint on the workflow status table. A foreign key constraint in a database may establish a link between two tables by referencing the primary key of one table in another table. This constraint may help maintain referential integrity by ensuring that values in the foreign key column correspond to existing values in the referenced primary key column of the related table. By setting the workflow's status to pending and/or recording the workflow inputs, the system may ensure that the workflow is properly initialized and/or is ready for execution.

In some aspects, the system may use the log to resume the workflow from a point of interruption in case of a system failure. This may involve retrieving the logged results from the database, determining the last successfully executed step, and/or restarting the workflow from that step. This approach may ensure that the workflow is executed exactly once, even in the face of system failures and/or other disruptions. This may provide a robust mechanism for ensuring exactly-once semantics for workflows, which can potentially simplify the development of reliable, transactionally correct applications.

In some aspects, the method 400 may include removing the workflow from a pending workflow map. This may involve updating a data structure that keeps track of the workflows that are currently being executed. By removing the workflow from the map, the system may free up resources that can be used for the execution of other workflows.

In some cases, the method 400 may include collecting snapshot information for read-only transactions and/or non-preset UUID transactions. This may involve capturing the state of the database before and/or after the execution of the transaction. The snapshot information may be used for various purposes, such as debugging, performance analysis, and/or recovery from failures. By collecting snapshot information, the system may provide a detailed record of the execution of the transaction, which can potentially improve the reliability and/or robustness of the system.

In some aspects, the system may be configured to execute communicator functions as part of the workflow. These communicator functions may include interactions with external systems, such as sending requests to or receiving responses from these systems. The execution of communicator functions may be subject to various challenges, such as network failures, system crashes, and/or slow responses from the external systems. To handle these challenges, the system may implement a retry logic that attempts to execute the communicator function multiple times until it succeeds. In some cases, this retry logic may involve an exponential backoff strategy, where the system waits for an increasing amount of time between each retry. This approach may reduce the load on the external systems and/or increase the likelihood of successful execution.

In some embodiments, the system may be designed to process messages from a Kafka consumer exactly once. Kafka is a distributed event streaming platform that is commonly used for building real-time data pipelines and streaming applications. However, ensuring exactly-once semantics in Kafka can be challenging due to the distributed nature of the platform. To address this challenge, the system may implement a mechanism that processes each Kafka message exactly once, regardless of interruptions, crashes, and/or failures. This mechanism may involve constructing an idempotency key for each Kafka message, checking the idempotency key before processing the message, and/or committing the message's offset to Kafka only after the message has been successfully processed. The idempotency key may be constructed from the message's topic, partition, and/or offset, which are guaranteed to be unique for a Kafka cluster. This approach may ensure that each Kafka message is processed exactly once, improving the data integrity and/or reliability of the system.

In some cases, the system may be configured to handle workflows that include both database transactions and/or Kafka message processing. For instance, when a Kafka message is received, the system may construct an idempotency key for the message and/or use this key to ensure exactly-once processing of the message. The system may then execute a transaction or a workflow based on the content of the Kafka message, ensuring exactly-once semantics for the transaction and/or workflow as well. This unified model for transactional execution may simplify the development of applications that require strong consistency guarantees across both database operations and/or Kafka message processing.

Example Once and Only Once Embodiments

In some embodiments, a system for transactional execution of workflows can include a processor and/or a non-transitory, processor-readable storage medium. The non-transitory, processor-readable storage medium may include one or more programming instructions that, when executed, cause the processor to receive a workflow comprising one or more transactions in a database-based application; record in the database an idempotency key associated with the workflow; for each of the one or more transactions invoked from the workflow: execute the transaction, record an execution record for the transaction in the transaction, and/or commit the transaction, including the execution record, to the database.

In some embodiments, the one or more programming instructions can further cause the processor to determine if the idempotency key is already recorded in the database; and in response to the determination, can resume the workflow using previously computed data.

In some embodiments, the one or more programming instructions can further cause the processor to execute a call to an external system; and can record, in the database, the call to the external system.

In some embodiments, the one or more programming instructions can further cause the processor to determine if the call is already recorded in the database; and in response to the determination, resume the workflow using output from the call as previously computed.

In some embodiments, the idempotency key can be a universally unique identifier.

In some embodiments, each of the one or more transactions can be implemented atomicity, consistency, isolation, and/or durability (ACID) properties.

In some embodiments, the one or more programming instructions that, when executed, cause the processor to commit the transaction can further cause the processor to, in response to the transaction being read-only, buffer the output; wait for a proceeding write transaction; and/or commit the buffer to the database.

In some embodiments, the one or more programming instructions can further cause the processor to log each step of the workflow in the database; and/or use the logged steps to resume the workflow from a point of interruption in case of a system failure.

In some embodiments, a method for transactional execution of workflows can include: receiving a workflow comprising one or more transactions in a database-based application; recording in the database an idempotency key associated with the workflow; for each of the one or more transactions invoked from the workflow executing the transaction, recording an execution record for the transaction in the transaction, and/or committing the transaction, including the execution record, to the database.

In some embodiments, the method can include determining if the idempotency key is already recorded in the database; and in response to the determination, resuming the workflow using previously computed data.

In some embodiments, the method can include executing a call to an external system; and recording, in the database, the call to the external system.

In some embodiments, the method can include determining if the call is already recorded in the database; and in response to the determination, resuming the workflow using output from the call as previously computed.

In some embodiments, the idempotency key can be a universally unique identifier.

In some embodiments, each of the one or more transactions can be implemented with atomicity, consistency, isolation, and/or durability (ACID) properties.

In some embodiments, committing the transaction can further comprise, in response to the transaction being read-only, buffering the output; waiting for a proceeding write transaction; and/or committing the buffer to the database.

In some embodiments, the method can include logging each step of the workflow in the database; and/or using the logged steps to resume the workflow from a point of interruption in case of a system failure.

Example Computing Systems

Figure 5:
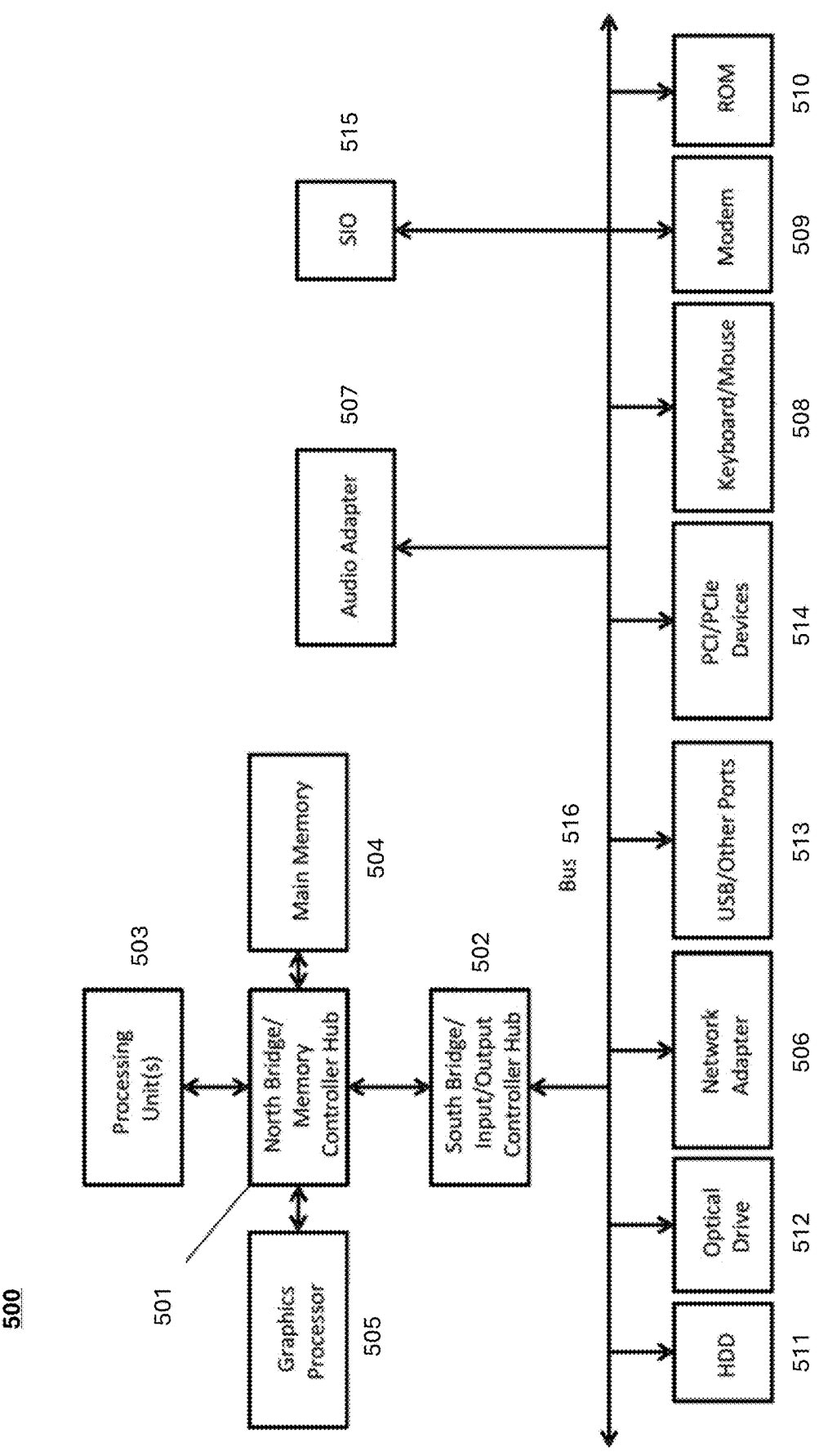
FIG. 5 illustrates a block diagram of a data processing system in which embodiments are implemented.

FIG. 5 illustrates a block diagram of an example data processing system 500 in which embodiments are implemented. The data processing system 500 is an example of a computer, such as a server or client, in which computer usable code and/or instructions implementing the process for illustrative embodiments of the present invention are located. In some embodiments, the data processing system 500 may be a server computing device. For example, the data processing system 500 may be implemented in a server and/or another similar computing device processing the applications and/or managing the databases described herein.

In the depicted example, the data processing system 500 may employ a hub architecture including a north bridge and memory controller hub (NB/MCH) 501 and/or south bridge and/or input/output (I/O) controller hub (SB/ICH) 502. A processing unit 503, a main memory 504, and/or a graphics processor 505 may be connected to the NB/MCH 501. The graphics processor 505 may be connected to the NB/MCH 501 through, for example, an accelerated graphics port (AGP).

In the depicted example, a network adapter 506 connects to the SB/ICH 502. An audio adapter 507, a keyboard and/or mouse adapter 508, a modem 509, a read only memory (ROM) 510, a hard disk drive (HDD) 511, an optical drive (e.g., CD or DVD) 512, a universal serial bus (USB) ports and/or other communication ports 513, and/or PCI/PCIe devices 514 may connect to the SB/ICH 502 through a bus system 516. The PCI/PCIe devices 514 may include Ethernet adapters, add-in cards, and/or PC cards for notebook computers. The ROM 510 may be, for example, a flash basic input/output system (BIOS). The HDD 511 and/or the optical drive 512 may use an integrated drive electronics (IDE) and/or serial advanced technology attachment (SATA) interface. A super I/O (SIO) device 515 may be connected to the SB/ICH 502.

An operating system may run on the processing unit 503. The operating system may coordinate and/or provide control of various components within the data processing system 500. As a client, the operating system may be a commercially available operating system. An object-oriented programming system, such as the Java™ programming system, may run in conjunction with the operating system and provide calls to the operating system from the object-oriented programs and/or applications executing on the data processing system 500. As a server, the data processing system 500 may be an IBM® eServer™ System® running the Advanced Interactive Executive operating system and/or the Linux operating system. The data processing system 500 may be a symmetric multiprocessor (SMP) system that includes a plurality of processors in the processing unit 503. Alternatively, a single processor system may be employed.

Instructions for the operating system, the object-oriented programming system, and/or applications or programs are located on storage devices, such as the HDD 511, and/or are loaded into the main memory 504 for execution by the processing unit 503. The processes for embodiments described herein may be performed by the processing unit 503 using computer usable program code, which can be located in a memory such as, for example, main memory 504, ROM 510, and/or in one or more peripheral devices.

A bus system 516 may comprise one or more busses. The bus system 516 may be implemented using any type of communication fabric and/or architecture that provides for a transfer of data between different components and/or devices attached to the fabric and/or architecture. A communication unit such as the modem 509 and/or the network adapter 506 may include one or more devices that can be used to transmit and/or receive data.

Those of ordinary skill in the art will appreciate that the hardware depicted in FIG. 5 may vary depending on the implementation. Other internal hardware or peripheral devices, such as flash memory, equivalent non-volatile memory, and/or optical disk drives may be used in addition to or in place of the hardware depicted. Moreover, the data processing system 500 can take the form of any of a number of different data processing systems, including but not limited to, client computing devices, server computing devices, tablet computers, laptop computers, telephone and/or other communication devices, personal digital assistants, and/or the like. Essentially, data processing system 500 can be any known or later developed data processing system without architectural limitation.

Example Code

FIG. 6 depicts example code for migrating provenance schema in accordance with an embodiment. The example code can implement a schema migration function that can synchronize column definitions from a source user database to a provenance database. It may compare the columns in both databases, and can add new columns and/or modifying existing ones in the provenance database to match the source database. The function may handle cases where columns need to be added, their types need to be changed, and/or default values need to be set or removed.

FIG. 7 depicts example code for time travel query transformation in accordance with an embodiment. The example code can implement a time travel query transformation by constructing a complex Boolean expression tree. It may create nodes for various time-related conditions, such as transaction IDs, sequence numbers, and/or ID lists, and/or combine them into a final clause that can determine the visibility of rows based on their transaction history.

FIG. 8 depicts example code for executing a workflow in accordance with an embodiment. The example code can implement a workflow execution system. It may handle the lifecycle of a workflow, including initialization, execution, error handling, and/or result management, while also maintaining workflow status and/or managing database interactions.

FIG. 9 depicts example code for executing a transaction in accordance with an embodiment. The example code can implement two main functions: a transaction function and a communicator function. The transaction function may handle database transactions with features such as retrying on serialization failures, caching results, and/or handling read-only transactions differently. The communicator function may manage communication operations with retry logic, error handling, and/or result caching.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is also to be understood that the terminology used herein is for the purpose of describing particular embodiments only and is not intended to be limiting.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed:

1. An operating system platform comprising:

one or more computer processors; and a non-transitory computer readable storage medium storing instructions that when executed by the one or more computer processors, cause the one or more computer processors to:

store, by a transactional datastore, workflow state information, wherein services of an operating system are included in the transactional datastore, the services comprising process scheduling, memory management, and file system operations;

execute, by a workflow engine, a workflow, wherein a portion of the workflow is annotated with decorators specifying infrastructure requirements, wherein the workflow engine assigns a unique identifier to each instance of executing code to ensure exactly-once execution;

check, by the workflow engine, for existing execution records before starting the workflow to prevent duplicate executions;

automatically provision, by the workflow engine, infrastructure resources based on the decorators specifying infrastructure requirements;

execute, by an execution manager, functions with configurable isolation levels, wherein the functions are database transactions implemented with atomicity, consistency, isolation, and durability properties;

include, by the execution manager, execution records in a transaction as workflow operations to ensure atomicity;

generate, by a compiler, transactional datastore stored procedures from high-level procedural language code defining the workflow, wherein the stored procedures are generated in a SQL-based language compatible with the transactional datastore;

facilitate read/write interaction between application logic and the transactional datastore through an object-relational mapping layer that maps between object-oriented programming constructs and transactional datastore structures;

store historical versions of data from the transactional datastore in a provenance database;

capture changes to the transactional datastore using logical replication to populate the provenance database with versioned records;

communicate, by a messaging system, between workflows, wherein the messaging system provides exactly-once delivery semantics for messages between workflows; and generate and utilize idempotency keys, by the workflow engine, when interacting with external systems to prevent duplicate actions in case of retries.

2. The platform of claim 1, wherein the executional datastore is configured to accept user-defined functions that automatically execute when a specific event occurs in a table, view, or foreign table.

3. The platform of claim 1, wherein the execution manager is configured to support at least one of read uncommitted, read committed, repeatable read, and serializable isolation levels.

4. The platform of claim 1, wherein the compiler is configured to generate the stored procedures in a dialect of SQL compatible with the transactional datastore.

5. The platform of claim 1, wherein at least one of the decorators defines access roles assigned to the portion of the workflow.

6. The platform of claim 1, further comprising a scheduler configured to manage execution of periodic and event-driven tasks.

7. The platform of claim 1, further comprising a provenance database configured for storing historical versions of data from the transactional datastore.

8. The platform of claim 7, wherein the provenance database is configured to store multiple versions of each data record with corresponding transaction identifiers indicating when each version was created or superseded.

9. The platform of claim 7, wherein the provenance database is configured to capture changes to the transactional datastore using logical replication.

10. The platform of claim 7, further comprising a time travel proxy configured to transform user queries to retrieve data from the provenance database as of a specified point in time.

11. The platform of claim 7, wherein the provenance database is configured to store snapshot information mapping transaction identifiers to timestamps.

12. The platform of claim 7, wherein the provenance database is configured to enable auditing of database interactions by storing information about which transactions modified specific data records.

13. The platform of claim 7, wherein the provenance database is configured to recover data in the transactional datastore.

14. The platform of claim 7, wherein the instructions that when executed by the one or more computer processors, cause the one or more computer processors to recall, from the provenance database, historical functions and corresponding transactions for debugging the high-level procedural language code.

15. The platform of claim 1, further comprising an object-relational mapping (ORM) layer configured to map between object-oriented programming constructs and transactional datastore structures, wherein the ORM layer provides an abstraction for interacting with the transactional datastore using object-oriented programming languages.

16. The platform of claim 15, wherein the ORM layer comprises at least one of SQLAlchemy, Drizzle, Knex, Prisma, and TypeORM.

17. The platform of claim 1, wherein at least one of the decorators specifies a maximum number of times the workflow may be automatically recovered.

18. The platform of claim 1, wherein at least one of the decorators specifies a backoff rate between attempts to retry a step of the workflow.

19. The platform of claim 1, wherein the functions are database transactions.

20. The platform of claim 1, wherein the operating system runs on bare metal.

21. The platform of claim 1, wherein the transactional datastore is a relational database.

22. The platform of claim 1, wherein the transactional datastore is a NoSQL transactional database.

23. The platform of claim 1, wherein the transactional datastore is an arbitrary database.

24. The platform of claim 1, wherein the workflow comprises operating system services comprising process scheduling, memory management, and file system operation.

25. A method for processing workflows using a transactional datastore, the method comprising:

storing, by the transactional datastore, workflow state information, wherein services of an operating system are included in the transactional datastore, the services comprising process scheduling, memory management, and file system operations;

executing, by a workflow engine, a workflow, wherein a portion of the workflow is annotated with decorators specifying infrastructure requirements, wherein the workflow engine assigns a unique identifier to each instance of executing code to ensure exactly-once execution;

checking, by the workflow engine, for existing execution records before starting the workflow to prevent duplicate executions;

automatically provisioning, by the workflow engine, infrastructure resources based on the decorators specifying infrastructure requirements;

executing, by an execution manager, functions with configurable isolation levels, wherein the functions are database transactions implemented with atomicity, consistency, isolation, and durability properties;

including, by the execution manager, execution records in a transaction as workflow operations to ensure atomicity;

generating, by a compiler, transactional datastore stored procedures from high-level procedural language code defining the workflow, wherein the stored procedures are generated in a SQL-based language compatible with the transactional datastore;

facilitating read/write interaction between application logic and the transactional datastore through an object-relational mapping layer that maps between object-oriented programming constructs and transactional datastore structures;

storing historical versions of data from the transactional datastore in a provenance database;

capturing changes to the transactional datastore using logical replication to populate the provenance database with versioned records;

communicating, by a messaging system, between workflows, wherein the messaging system provides exactly-once delivery semantics for messages between workflows; and generating and utilizing idempotency keys, by the workflow engine, when interacting with external systems to prevent duplicate actions in case of retries.

26. The method of claim 25, wherein capturing changes to the transactional datastore using logical replication to populate the provenance database with versioned records comprises:

receiving write-ahead log data from the transactional datastore;

parsing the write-ahead log data to extract transaction information, comprising transaction identifiers, operation types, and modified data;

transforming the extracted transaction information into versioned records, each versioned record comprising a begin transaction identifier and an end transaction identifier; and modifying the provenance database based on the versioned records.

27. The method of claim 25, wherein the transactional datastore is configured to accept user-defined functions that automatically execute when a specific event occurs in a table, view, or foreign table.

28. The method of claim 25, wherein the execution manager is configured to support at least one of read uncommitted, read committed, repeatable read, and serializable isolation levels.

29. The method of claim 25, wherein the compiler is configured to generate the stored procedures in a dialect of SQL compatible with the transactional datastore.

30. The method of claim 25, wherein at least one of the decorators defines access roles assigned to the portion of the workflow.

31. The method of claim 25, further comprising managing execution of periodic and event-driven tasks using a scheduler.

32. The method of claim 25, further comprising storing historical versions of data from the transactional datastore in a provenance database.

33. The method of claim 25, wherein the object-relational mapping layer provides an abstraction for interacting with the transactional datastore using object-oriented programming languages.

\* \* \* \* \*